United States Patent
Seasholtz et al.

(10) Patent No.: US 10,368,706 B1
(45) Date of Patent: Aug. 6, 2019

(54) VACUUM FILTER HAVING ANNULAR CATCH

(71) Applicant: SHOP VAC CORPORATION, Williamsport, PA (US)

(72) Inventors: Craig A. Seasholtz, Avis, PA (US); Kurt Westbrook, Cogan Station, PA (US); Jason Gottschall, South Williamsport, PA (US)

(73) Assignee: SHOP VAC CORPORATION, Williamsport, PA (US)

( * ) Notice: Subject to any disclaimer, the term of this patent is extended or adjusted under 35 U.S.C. 154(b) by 0 days.

(21) Appl. No.: 16/037,853

(22) Filed: Jul. 17, 2018

(51) Int. Cl.
*A47L 9/12* (2006.01)
*B01D 46/00* (2006.01)
*A47L 9/16* (2006.01)

(52) U.S. Cl.
CPC .......... *A47L 9/1683* (2013.01); *B01D 46/001* (2013.01); *B01D 46/0005* (2013.01); *A47L 9/127* (2013.01); *A47L 9/1608* (2013.01); *A47L 9/1675* (2013.01)

(58) Field of Classification Search
CPC ...... A47L 9/1683; A47L 9/1608; A47L 9/127; A47L 9/1675; A47L 9/125; A47L 9/12; B01D 46/001; B01D 46/0005
See application file for complete search history.

(56) References Cited

U.S. PATENT DOCUMENTS

| | | |
|---|---|---|
| 1,538,980 A | 5/1925 | Genter |
| 1,782,640 A | 11/1930 | Wenner-Gren |
| 2,519,082 A | 8/1950 | Stevenson |
| 3,048,958 A | 8/1962 | Barnes |
| 3,254,480 A | 6/1966 | Rideout |
| 4,052,163 A | 10/1977 | Patzner |
| 4,185,974 A | 1/1980 | Hiester |
| 4,532,670 A | 8/1985 | Fortune |
| 4,544,387 A | 10/1985 | Agerlid |
| 5,102,435 A | 4/1992 | Rau et al. |
| 5,151,181 A | 9/1992 | Barry |
| 5,369,839 A | 12/1994 | Worwag |
| RE34,980 E | 6/1995 | Rau et al. |
| 5,733,351 A | 3/1998 | Hult et al. |
| 5,776,216 A | 7/1998 | Yang |
| 5,855,634 A | 1/1999 | Berfield |
| 6,110,248 A | 8/2000 | Liu |
| 6,192,550 B1 | 2/2001 | Hamada et al. |
| 6,569,218 B2 | 5/2003 | Dudley |
| 6,626,973 B2 | 9/2003 | Park |
| 6,668,421 B1 | 12/2003 | Song |

(Continued)

FOREIGN PATENT DOCUMENTS

| | | |
|---|---|---|
| EP | 1023864 B1 | 11/2006 |
| EP | 1912554 A1 | 4/2008 |

(Continued)

*Primary Examiner* — David Redding
(74) *Attorney, Agent, or Firm* — Marshall, Gerstein & Borun LLP

(57) ABSTRACT

A filter for a vacuum cleaner includes a top having an open center, a bottom plate having an outermost edge, a center, an inside surface facing towards the top, an outside surface facing away from the top, and a catch extending from the inside surface annularly around the center, filter material being secured between the top and bottom plate. An adaptor for a filter cage or the filter cage itself includes a radial retention ring that engages the catch of the filter.

18 Claims, 25 Drawing Sheets

(56) References Cited

U.S. PATENT DOCUMENTS

| | | |
|---|---|---|
| 6,829,805 B2 | 12/2004 | Yang |
| 6,951,045 B2 | 10/2005 | Thur et al. |
| 7,160,346 B2 | 1/2007 | Park |
| 7,476,267 B2 | 1/2009 | Greene et al. |
| 7,552,506 B2 | 6/2009 | Lee et al. |
| 7,611,553 B2 | 11/2009 | Hato |
| 7,665,062 B1 | 2/2010 | Bauer et al. |
| 7,669,282 B2 | 3/2010 | Jung et al. |
| 7,779,506 B2 | 8/2010 | Kang et al. |
| 7,779,507 B2 | 8/2010 | Jung et al. |
| 7,922,794 B2 | 4/2011 | Morphey |
| 8,028,373 B2 | 10/2011 | Rowntree |
| 8,161,597 B2 | 4/2012 | Witter et al. |
| 8,161,599 B2 | 4/2012 | Griffith et al. |
| 8,206,482 B2 | 6/2012 | Williams et al. |
| 8,424,153 B2 | 4/2013 | Fester et al. |
| 8,443,486 B2 | 5/2013 | Yamaura et al. |
| 8,557,008 B2 | 10/2013 | Williams et al. |
| 8,615,844 B2 | 12/2013 | Van Raalte et al. |
| 9,038,236 B2 | 5/2015 | Fry et al. |
| 9,125,535 B2 | 9/2015 | Witter et al. |
| 9,399,184 B2 | 7/2016 | Witter et al. |
| 9,510,718 B2 | 12/2016 | Schultz et al. |
| 9,516,980 B2 | 12/2016 | Kim |
| 2004/0098826 A1 | 5/2004 | Joo et al. |
| 2004/0194437 A1 | 10/2004 | Macleod et al. |
| 2009/0165240 A1 | 7/2009 | Choi |
| 2009/0165825 A1 | 7/2009 | Choi |
| 2013/0228194 A1 | 9/2013 | Holsten |
| 2014/0008289 A1 | 1/2014 | Williams et al. |
| 2014/0215752 A1 | 8/2014 | Loveless et al. |
| 2017/0296013 A1 | 10/2017 | Warren et al. |
| 2018/0055318 A1 | 3/2018 | Gottschall et al. |

FOREIGN PATENT DOCUMENTS

| | | |
|---|---|---|
| EP | 1419724 B1 | 11/2009 |
| EP | 1214903 B1 | 3/2010 |
| EP | 1955631 B1 | 11/2010 |
| EP | 2348940 A1 | 8/2011 |
| EP | 2229855 A3 | 12/2011 |
| EP | 2523590 B1 | 11/2013 |
| EP | 2662009 B1 | 9/2015 |
| EP | 1899035 B1 | 4/2016 |
| EP | 2110062 B1 | 11/2016 |
| EP | 2574262 B1 | 6/2017 |
| EP | 3222185 A1 | 9/2017 |
| WO | WO-2006086712 A1 | 8/2006 |
| WO | WO-2007032796 A2 | 3/2007 |
| WO | WO-2010042694 A1 | 4/2010 |
| WO | WO-2017181048 A1 | 10/2017 |

SECTION A-A

DETAIL B
SCALE 2 : 1

SECTION A-A

DETAIL B
SCALE 2:1

SECTION C1-C1

SECTION D-D

VACUUM FILTER HAVING ANNULAR CATCH

FIELD OF THE DISCLOSURE

This application relates generally to a filter for a vacuum cleaner and, more specifically, to a filter for a vacuum cleaner having a bottom plate with an annular catch extending around a center of the bottom plate. An adaptor for use with the filter, as well as a vacuum cleaner in which the filter is used, is also disclosed.

BACKGROUND

Tank-type vacuum cleaners routinely include a tank having a dirty air inlet and a motor housing comprising a motor and a clean air outlet. In order to clean the air as it travels between the dirty air inlet and the clean air outlet, a filter is provided between the dirty air inlet and the clean air outlet. In some vacuums, a filter cage includes a float valve (such as a ball valve or a cup valve) and also serves as way to hold a filter in place as it extends into the bottom of the tank. The filter is usually secured around the filter cage. Improved methods of securing the filter to the filter cage are desirable.

SUMMARY

According to some aspects of the disclosure, a filter comprises a top having an open center, a bottom plate having an outermost edge, a center, an inside surface facing towards the top, and a catch extending from the inside surface annularly around the center, filter material being secured between the top and the bottom plate. According to other aspects of the disclosure, an adaptor for a filter cage includes an annular surface having an outer circumference and an inner circumference, snaps distributed around the outer circumference of the annular surface, and a radial retention ring extending from the inner circumference of the annular surface. According to yet other aspects of the disclosure, a vacuum cleaner comprises a tank including a dirty air inlet, a motor housing comprising a motor, a filter cage having an end, and a clean air outlet, and a radial retention ring connected to the end of the filter cage. The catch of the filter and the radial retention ring of the adaptor or vacuum cleaner are configured to engage one another.

In some arrangements of the filter, the catch may extend from the inside surface around the center continuously. In other arrangements, the catch may extend from the inside surface around the center discontinuously. The bottom plate may include a locking ring between the outermost edge and the center, wherein the catch extends toward the top from the locking ring. The catch may have a mating face inclined in a first direction relative to the inside surface and an inclined end inclined in a second direction relative to the inside surface. The mating face is at a 45° angle relative to the inside surface.

In some arrangements, the filter may further comprise a handle hinged to the outside surface of the plate. The handle may be located adjacent to the center of the plate. The bottom plate may have a depressed center area at the center, and a center orifice may be provided in the depressed center area. The locking ring may surround the depressed center area. A handle may be hinged to the locking ring. The handle may have a width less than or equal to an amount that the locking ring is raised from the adjacent outside surface of the bottom plate, and the locking ring may have an outer perimeter complementary to the shape of the handle.

The top of the filter may have an outer edge and a width between the outer edge and the open center, the bottom plate may have a raised ring extending inward from the outermost edge a distance equal to the width of the top, and the filter material may be secured between the top and the raised ring of the bottom plate. The bottom plate may further comprise a depressed ring adjacent to the raised ring and extending inward from the raised ring, a locking ring may be adjacent to the depressed ring, may be raised relative to the depressed ring, and may extend inward from the depressed ring, and the catch may extend toward the top from the locking ring.

In some arrangements of the adaptor, the radial retention ring may have a mating end inclined in a first direction relative to the annular surface. The radial retention ring may have a sliding surface the meets the mating end at an angle. The radial retention ring may extend continuously around the entire inner circumference of the annular surface.

In some arrangements of the vacuum cleaner, the vacuum cleaner comprises a filter surrounding the filter cage, the filter having a bottom plate with a catch that engages the radial retention ring. A mating face of the catch may engage a mating end of the radial retention ring. The catch may have inclined end, the radial retention ring may have a sliding surface, and prior to engagement of the catch with the radial retention ring, the catch may flex via contact between the inclined end of the catch and the sliding surface of the radial retention ring. In some arrangements, the radial retention ring is integral with the end of the filter cage. In other arrangements, the radial retention ring is provided on an adapter connected to the end of the filter cage.

DETAILED DESCRIPTION OF THE DRAWINGS

Referring now to the exemplary arrangements of a filter 4 shown in FIGS. 1-8, the filter 4 includes a top 6, a bottom plate 10, and filter material 22 secured between the top 6 and the bottom plate 10. The filter 4 has a generally cylindrical shape. The bottom plate 10 may be formed from rubber, hard plastic, metal, or another suitable material. The top 6 can be formed of similar materials, but generally will need to have some flexibility in order to provide good sealing engagement when in place on a vacuum cleaner. The filter material 22 may include any standard industrial filter material, such as a synthetic material, cloth, paper, or foam. The filter material 22 may employ a standard filtration material, a HEPA filtration material, an S-class filtration material, or activated charcoal filtration, among other options.

The top 6 and the bottom plate 10 are generally aligned with one another. In the arrangements depicted in FIGS. 1-8, the top 6 and the bottom plate 10 are the same size. In other arrangements not herein depicted, variations in the size and shape of the top 6 and the bottom plate 10 are permissible. For example, in some arrangements, the filter 4 may have a partially conical shape instead of a cylindrical shape. In such an arrangement, the bottom plate 10 may be bigger than the top 6, and the filter material 22 may be arranged at an angle from the bottom plate 10 to the top 6. In other arrangements, the top 6 and the bottom plate 10 may be different sizes, but the filter material 22 may still be arranged vertically between the bottom plate 10 and the top 6 such that the larger of the bottom plate 10 and the top 6 have an overhang outside the connection to the filter material 22.

Figure 4:
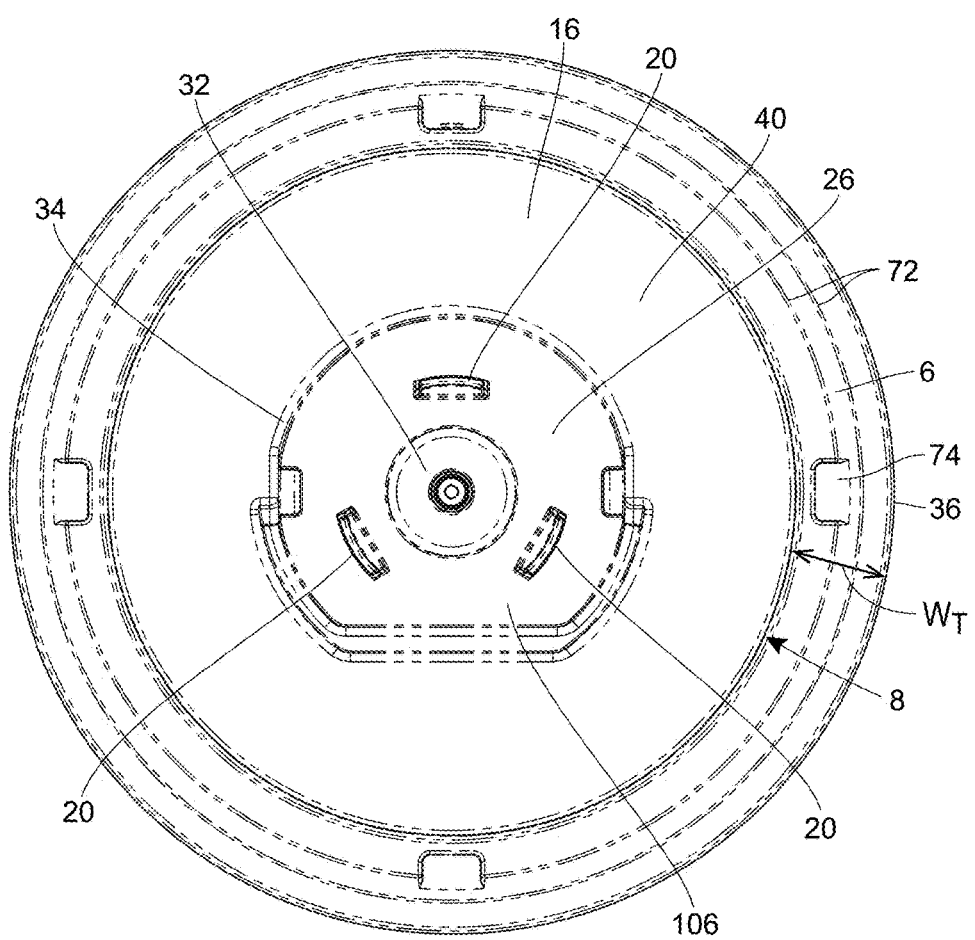
FIG. 4 is a top view of the filter depicted in FIGS. 1-3.
Figure 5:
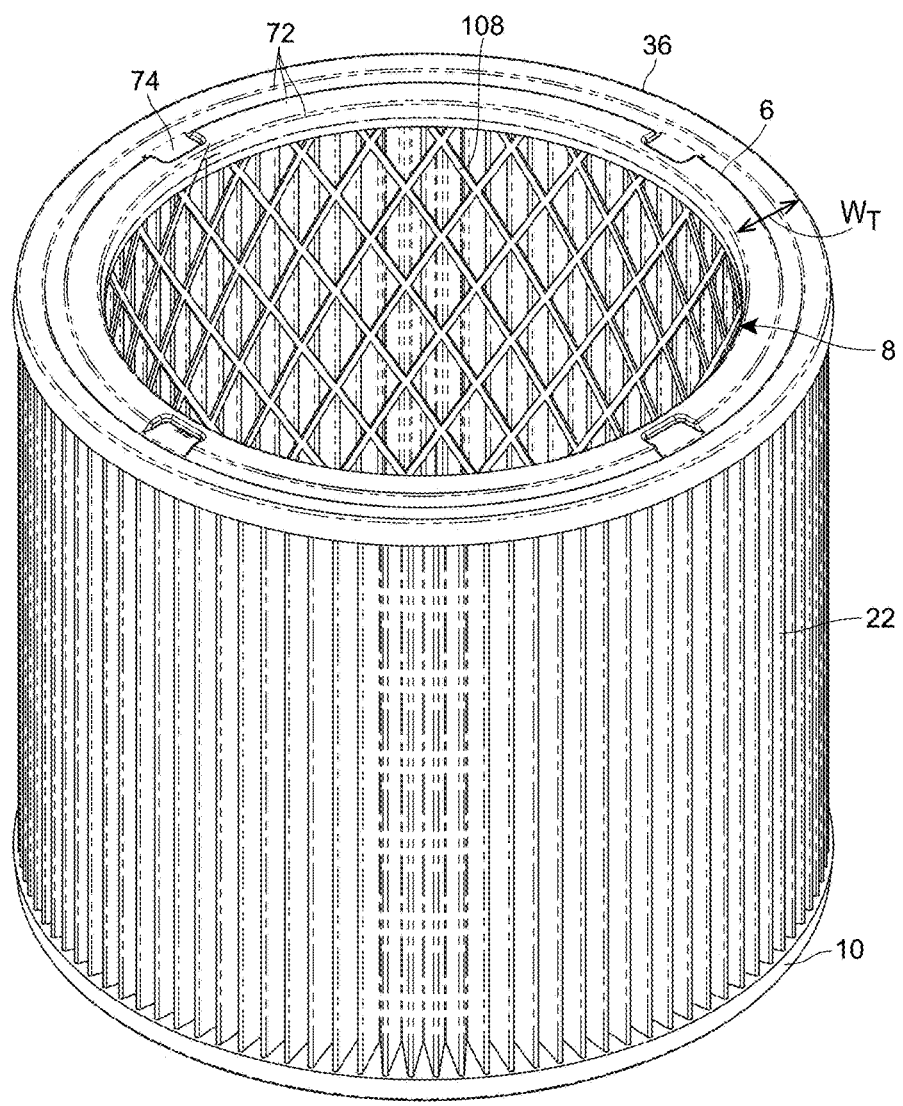
FIG. 5 is a top isometric view of the filter depicted FIGS. 1-4.
Figure 6:
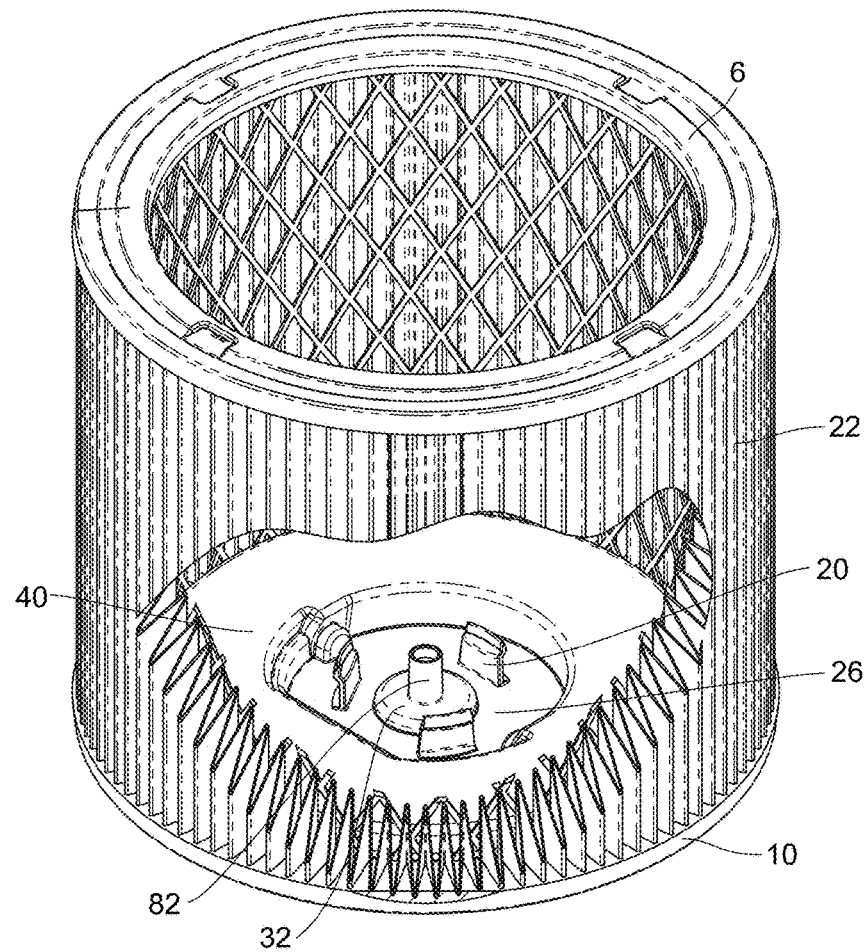
FIG. 6 is a top isometric cut-away view of the filter depicted in FIGS. 1-5.
Figure 8:
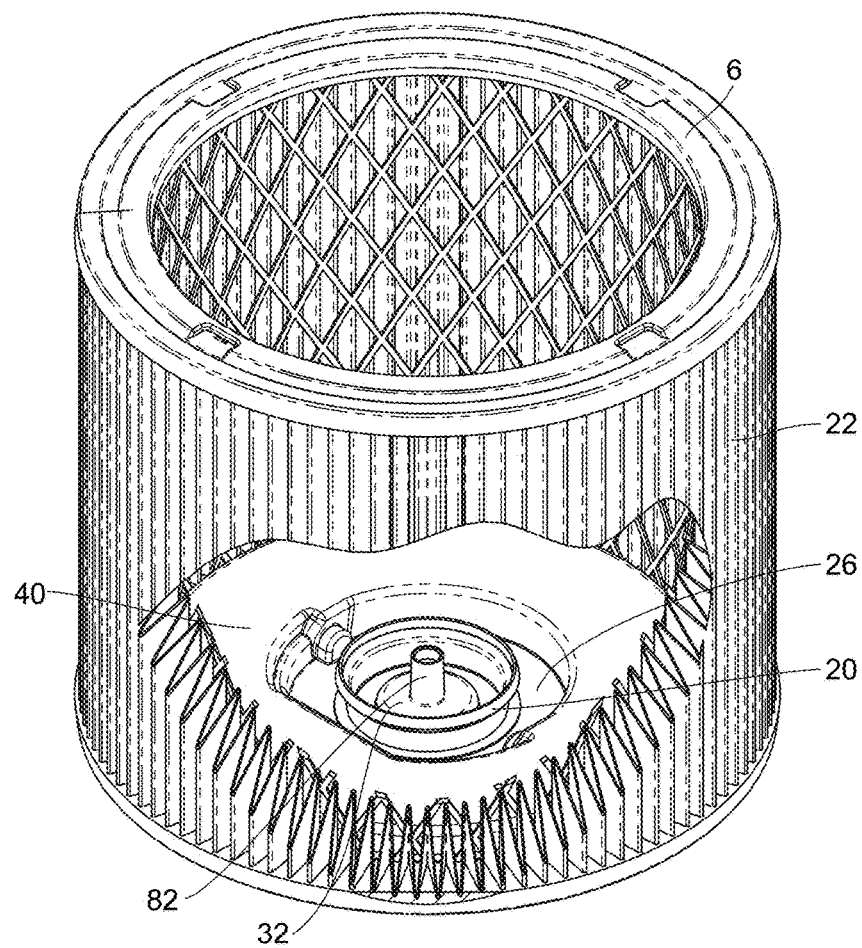
FIG. 8 is a top isometric cut-away view of the filter depicted in FIG. 7.

The top 6 includes an open center 8, as shown in FIGS. 5, 6, and 8. The bottom plate 10 has an outermost edge 12 and a center 14. An inside surface 16 of the bottom plate 10 faces toward the top 6, and an outside surface 18 of the bottom plate 10 faces away from the top 6. Catches 20 extend away from the inside surface 16 annularly around the center 8. As shown in FIG. 4, the catch 20 is visible through the open center 8 of the top 6.

Figure 7:
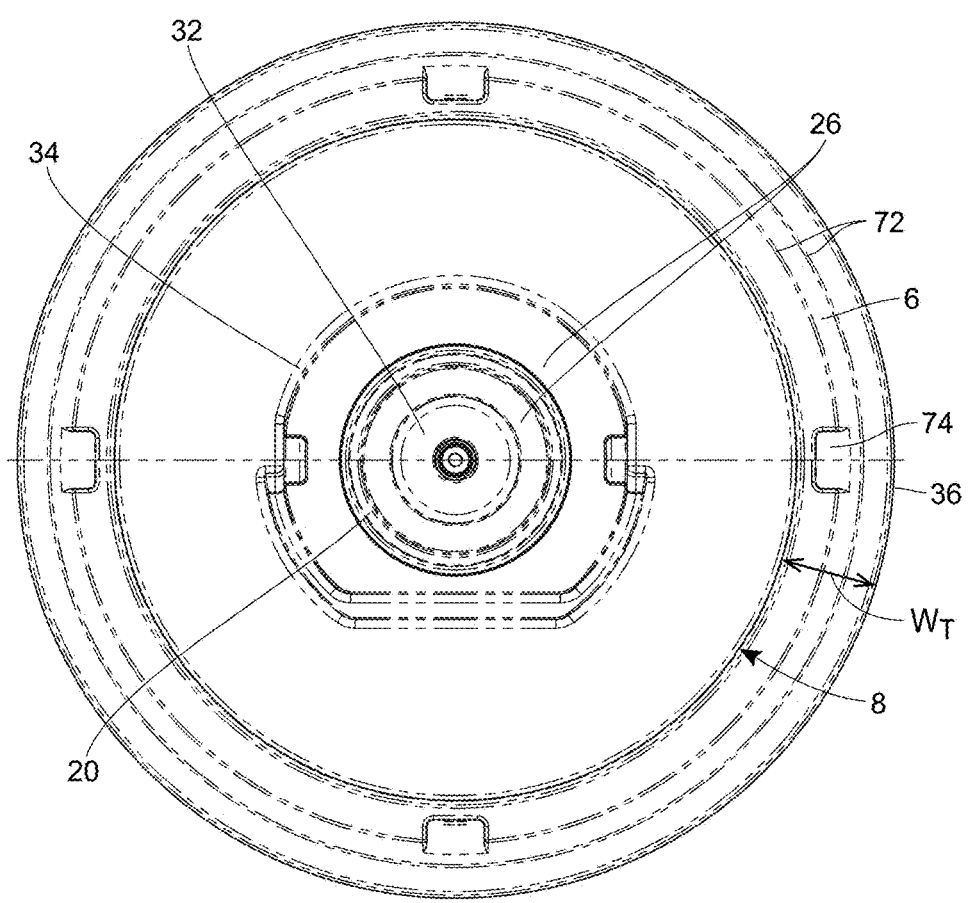
FIG. 7 is a top view of a filter of the present disclosure having a continuous catch.

The catch on the inside surface 16 may be a singular catch that extends from the inside surface 16 around the center continuously as shown in FIGS. 7 and 8. Alternately, the catch may be a plurality of catches 20, or put another way, may be a singular catch that extends from the inside surface 16 around the center discontinuously, as shown in FIGS. 4 and 6. The number of discontinuities 106, or spaces between catches 20, may be three, as shown in FIGS. 4 and 6. Alternately, the number of discontinuities 106 may be only one or may be more than three, such as five, ten, twenty, or fifty. The length of each discontinuity 106 may be uniform, may alternate in a pattern (a first distance, a second distance, then a first distance again, for example) or may vary with no discernible pattern. Each catch 20 may have a uniform width. Alternately, the width of each catch 20 may vary or may alternate in a pattern (a first width, a second width, then a first width again, for example). The length of each discontinuity 106 may be less than, equal to, or greater than the width of each catch 20.

Each catch 20 is designed to flex when contacted, and the dimensions of the catch 20 in conjunction with the material chosen for the catch 20 should permit this flexing action. In some arrangements, the catch 20 may be formed from a different material than the rest of the bottom plate 10 in order to facilitate the flexing action. For example, the catch 20 may be formed from a material that bends more easily or retains its shape better than the material used to form the bottom plate 10. The catch 20 may be formed integrally with the bottom plate 10. Alternately, the catch 20 may be a separate component connected or secured to the bottom plate 10. Means of securing the catch 20 to the bottom plate 10 include adhesives, standard fasteners such as screws, ultrasonic welding, and other fastening devices and techniques known in the art.

Figure 20A:
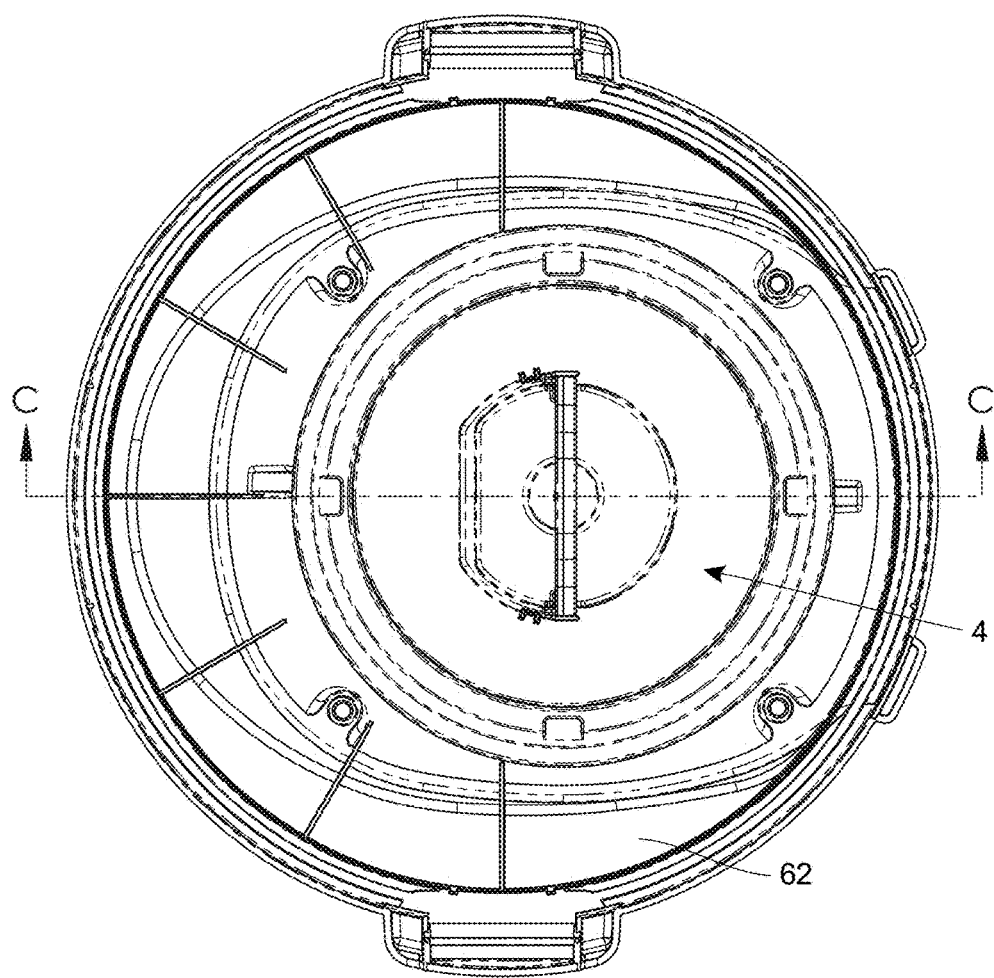
FIG. 20A is a bottom view of the lid, adaptor, and filter of FIGS. 18 and 19 just prior to the filter being secured to the adaptor.
Figure 20B:
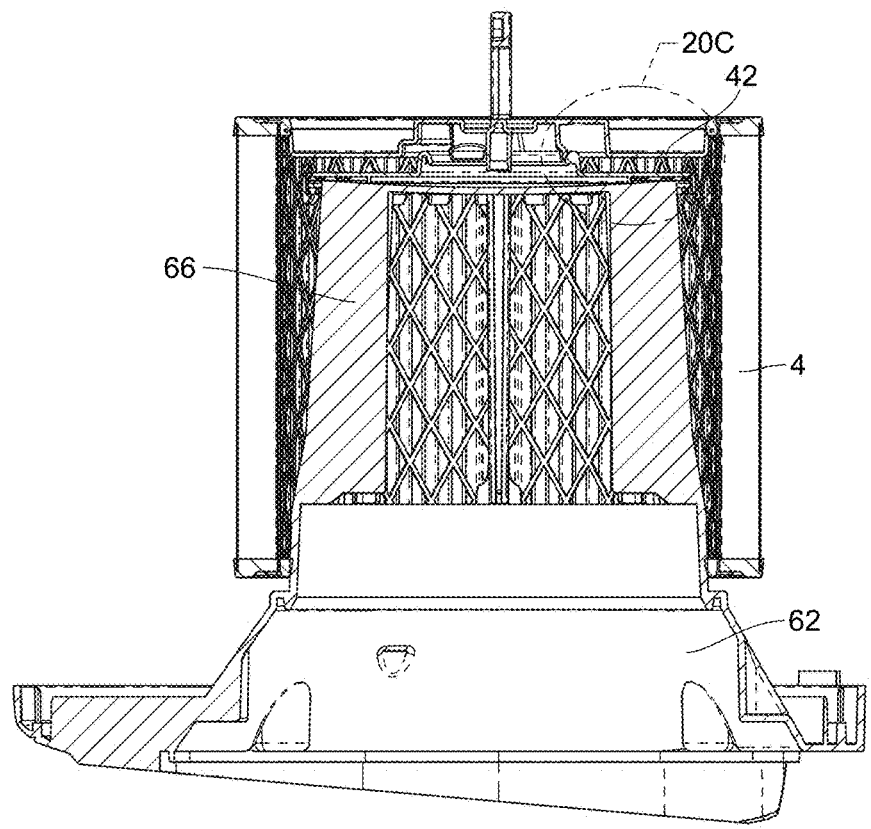
FIG. 20B is a cross-sectional view of the lid, adaptor, and filter of FIG. 20A along the line C-C.
Figure 20C:
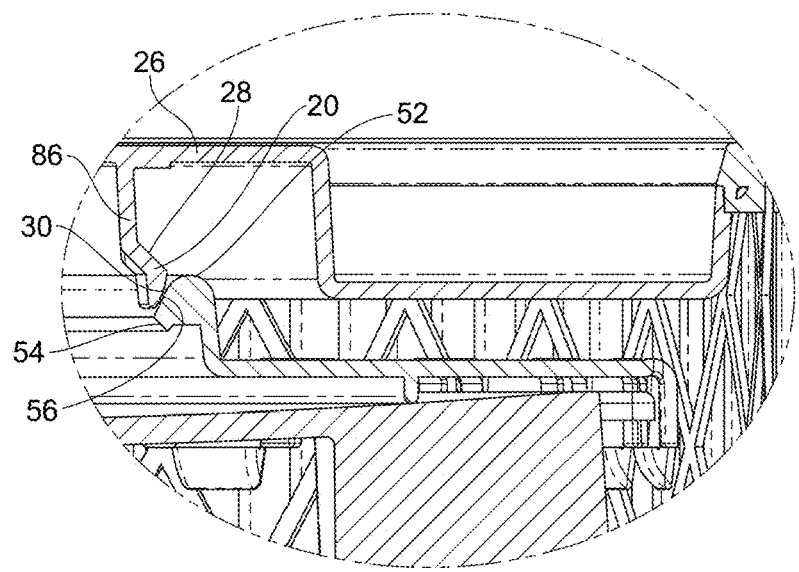
FIG. 20C is an enlarged view of the filter cage, adaptor, and filter depicted in FIGS. 19-20B showing the inclined end of the catch of the filter sliding along the sliding surface of the radial retention ring of the adaptor just prior to securing the filter to the adaptor.
Figure 21A:
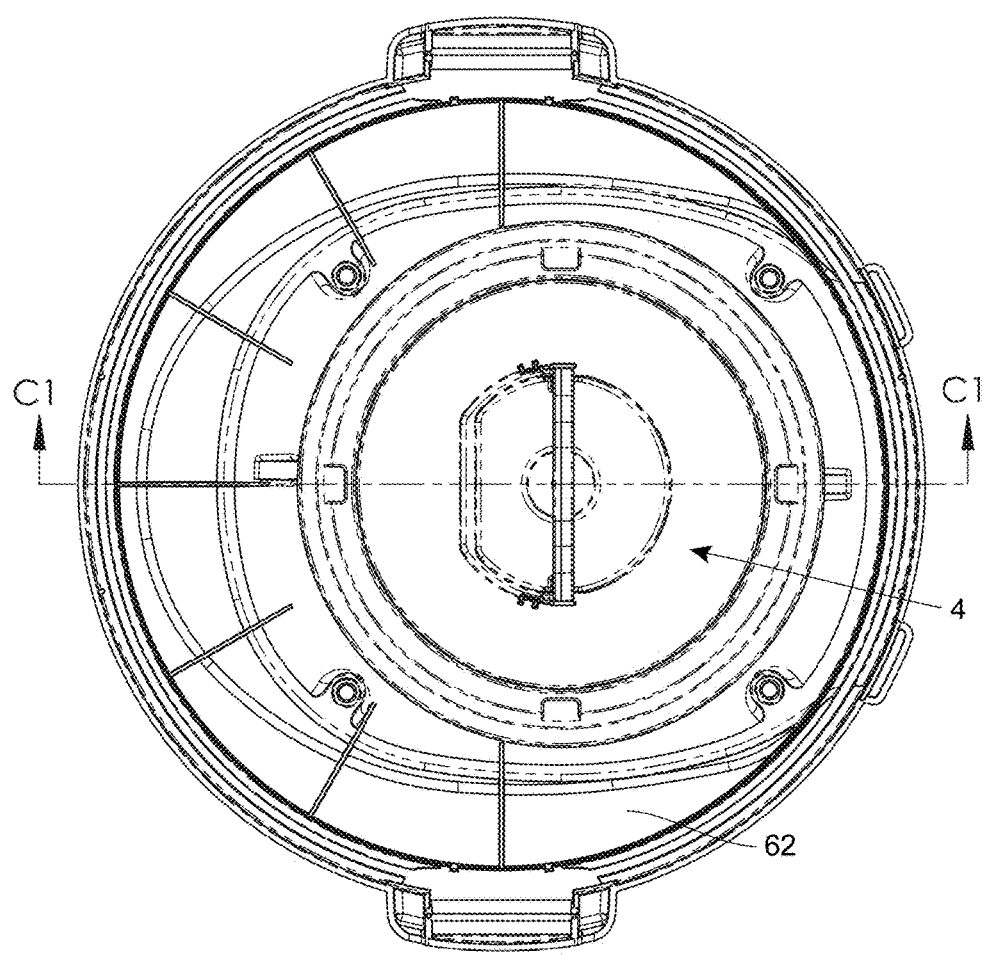
FIG. 21A is a bottom view of the lid, adaptor, and filter of FIGS. 18-20C after the filter is secured to the adaptor.
Figure 21B:
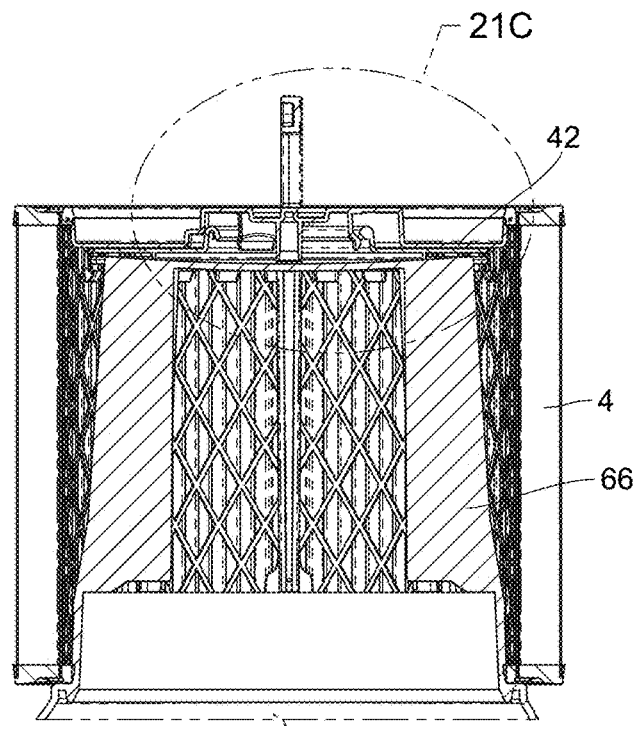
FIG. 21B is a cross-sectional view of the lid, adaptor, and filter of FIG. 21A along the line C1-C1.
Figure 21C:
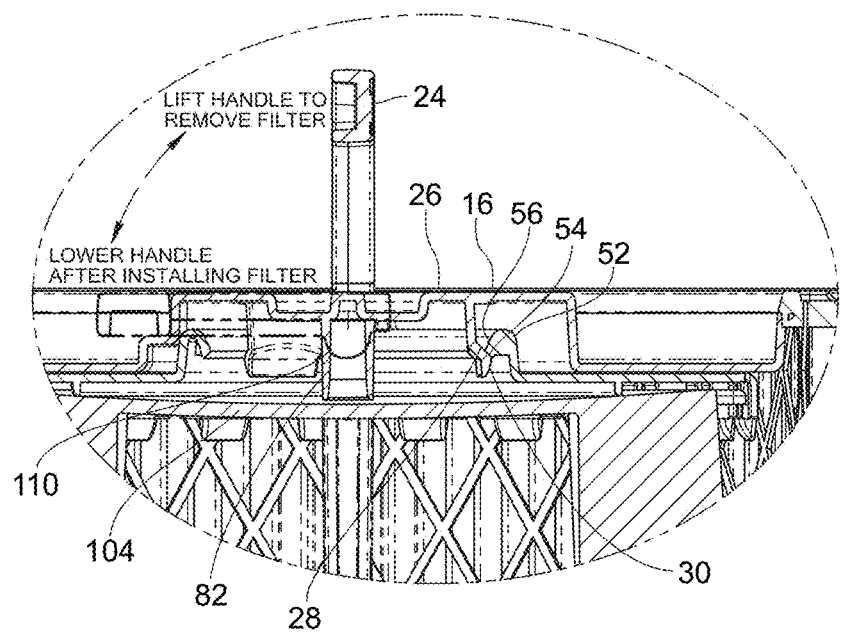
FIG. 21C is an enlarged view of the filter cage, adaptor, and filter depicted in FIGS. 14-16B showing the mating face of the catch engaged with the mating end of the radial retention ring.

Each catch 20 extends toward the top 6 from the locking ring 26, as best shown in FIGS. 6 and 8. As best shown in FIGS. 20C and 21C, each catch 20 has a mating face 28 inclined in a first direction relative to the inside surface 16 and an inclined end 30 inclined in a second direction relative to the inside surface 16. The mating face 28 is at a 45° angle relative to the inside surface. In other arrangements, the mating face 28 may be at angle that is greater than or less than 45° relative to the inside surface. Instead of being at an angle, the mating face 28 may have a curvature, hook, snap, aperture, or other means of being secured in place.

Figure 1:
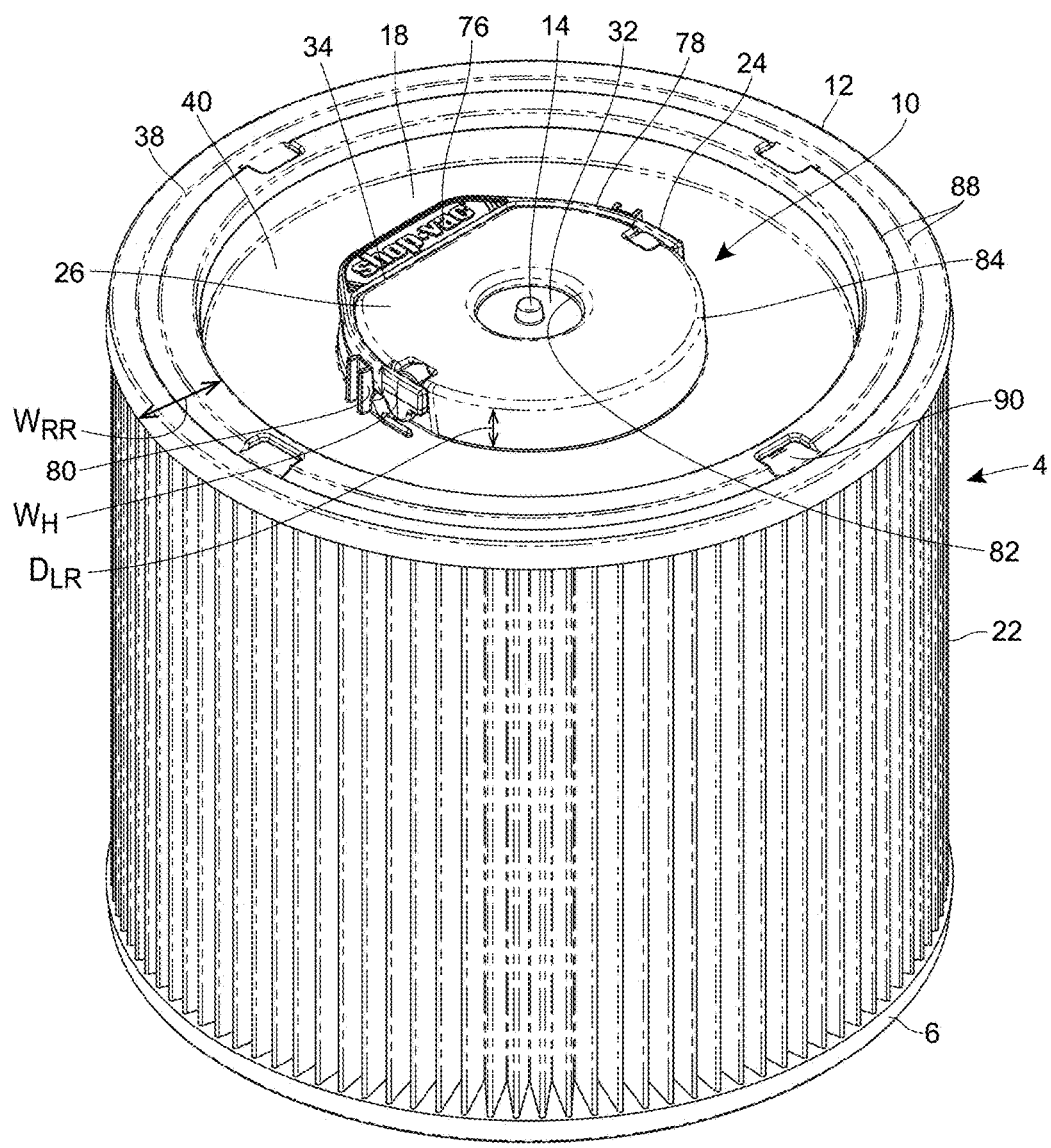
FIG. 1 is a bottom isometric view of a filter of the present disclosure having a discontinuous catch.
Figure 2:
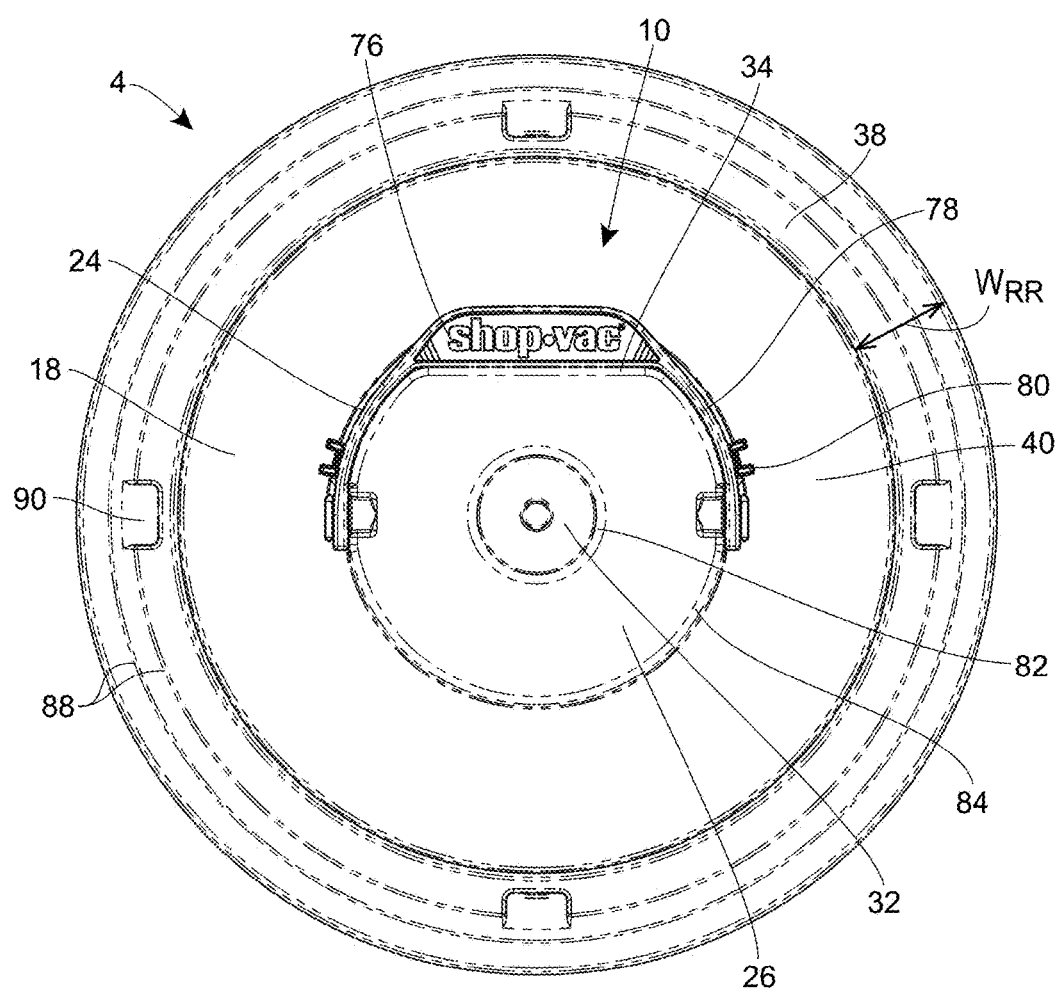
FIG. 2 is a bottom view of the filter depicted in FIG. 1.
Figure 3:
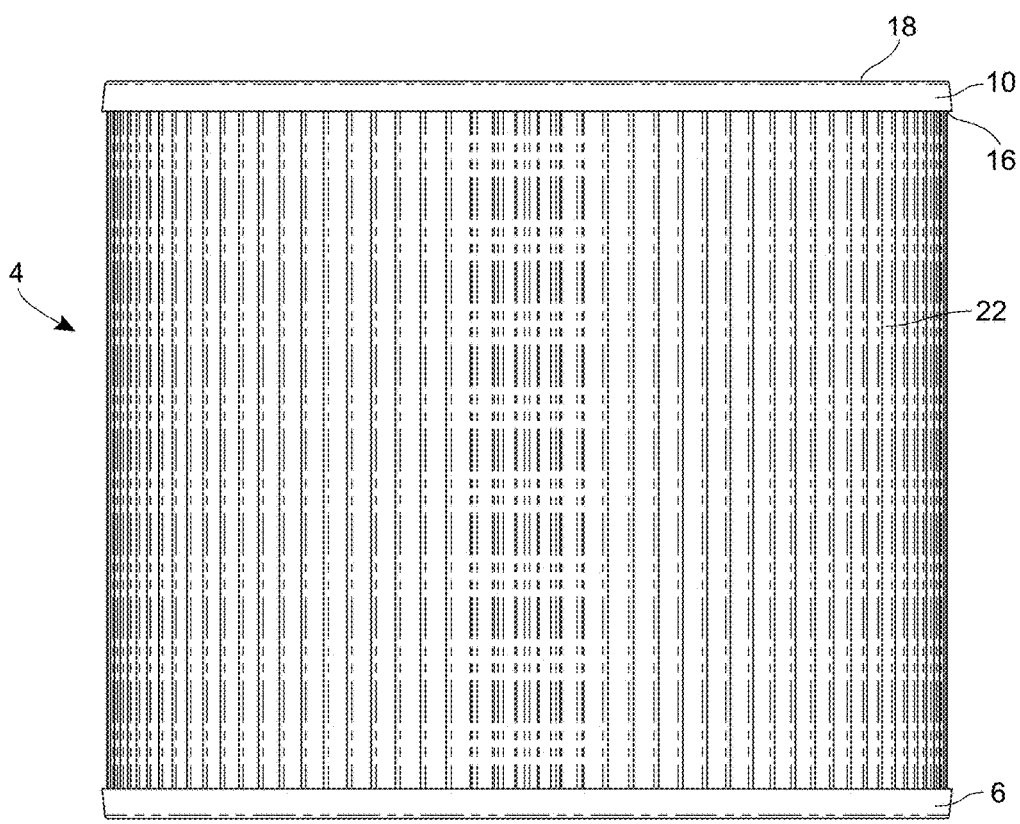
FIG. 3 is a side view of the filter depicted in FIGS. 1 and 2.

As shown in FIGS. 1 and 2, a handle 24 is hinged to the locking ring 26 of the bottom plate 10. The handle 24 is located adjacent to the center 14 of the plate. The handle 24 may assist a user in more easily placing the filter 4. The handle 24 can be stored during use of the vacuum cleaner 2. The handle 24 can also be used again to remove the filter 4 when the time comes to replace the filter 4. The handle 24 is particularly useful during removal of the filter 4 because the filter material 22 may be covered with dust and debris, and a user may therefore be disinclined to touch the filter material 22 during the removal process.

The handle 24 is hinged to the locking ring 26. The hinged connection may be achieved using any typical hinge mechanism in combination with a standard fastener. A handle guide 80 may be provided near where the handle 24 is hinged to the locking ring 26. The handle guide 80 may secure the handle 24 against the locking ring 26 when the handle 24 is folded toward the bottom plate 10. The handle guide 80 may help to guide the handle 24 as the handle 24 is rotated to an upright position away from the bottom plate 10. In some arrangements, the handle 24 may partially or fully rest on the handle guide 80 when in a folded position.

The handle 24 has a width $W_H$ that is less than or equal to a distance $D_{LR}$ that the locking ring 26 is raised from the adjacent outside surface 18 of the bottom plate 10. The locking ring 26 has an outer perimeter 34 that is complementary to the shape of the handle 24. As a result, the handle 24 can be folded flat to lie beside the locking ring 26 without protruding above the locking ring 26. In some arrangements not depicted, a securement mechanism such as a hook or a clip may be provided to secure the handle 24 in the folded position. In some arrangements, the securement mechanism may be the handle guide 80. In other arrangements, the handle 24 may have a friction fit against the outer perimeter 34 or via the hinged connection with the locking ring 26 that keeps it in a folded position.

The handle 24 may have a shape that includes a handle arc 78 and a handle protrusion 76. The handle arc 78 may curve from the location at which the handle 24 is hinged to the locking ring 26 to the protrusion 76. The handle arc 78 may be nearly circular, nearly square, or any preferred curvature. The protrusion 76 may have space for a brand name or trademark to be displayed. The brand name or trademark may be painted on the protrusion 76, may be embossed on the protrusion 76, or may be displayed in another manner. The protrusion 76 may be circular, square, or any other desired shape. The protrusion 76 may be centered in the handle arc 78 such that the handle 24 is symmetrical.

The perimeter 34 is at least partially complementary to the shape of the handle arc 78 and the protrusion 76 such that the handle 24 can fold down flat within the perimeter 34. In some embodiments, the perimeter 34 is complementary to the shape of the handle 24 only in one direction, such that the handle 24 may only be folded flat against the locking ring 26 one way. In other embodiments, the perimeter 34 is complementary to the shape of the handle in two directions, such that the handle may be folded flat against the locking ring 26 in two ways. A slanted surface 84 may be provided at the perimeter 34 so that, if the handle 24 bumps against the perimeter 34, the slanted surface 84 will help guide the handle 24 downward. The slanted surface 84 may be flat or curved.

The bottom plate 10 has a depressed center area 32 at the center 14. A slanted surface 82 may be provided in the transition from the locking ring 26 to the depressed center area 32. A center orifice 114 may be provided in the depressed center area 32, as shown in FIGS. 6, 8, and 21C. The center orifice 114 may be formed by orifice walls 110, as shown in FIG. 21C. The orifice walls 110 may provide structural integrity to the depressed center area 32. A user may feel confident that the filter 4 has been sufficiently pressed on to the filter cage 66 when the orifice walls 110 prevent further movement of the filter 4 due to contact between the orifice walls 110 and the round surface 104 of the filter cage 66.

As shown in FIG. 4, the top 6 has an outer edge 36 and a width $W_T$ between the outer edge 36 and the open center 8. An annular groove 72 may be provided in the top 6, as shown in FIG. 4. The annular groove 72 establishes different elevation levels for the filter media 22 to rest upon during manufacturing. This ensures that the filter media 22 has a sub-flush condition relative to at least some portions of the top 6. As also shown in FIG. 4, standoffs 74 may be provided in the top 6. The standoffs 74 position the cylindrical support cage 108 (shown in FIG. 5), which may be formed from metal or another rigid material, at an elevation deliberately sub-flush relative to at least some portions of the top 6. The sub-flush condition avoids undesirable handling issues for the user and assures that the top 6 has optimum sealing potential.

FIGS. 1, 2 and 4 show the topography of the bottom plate 10. The bottom plate 10 has a raised ring 38 extending inward from the outermost edge 12 of the bottom plate 10 a distance equal to the width $W_T$ of the top. The filter material 22 is secured between the top 6 and the raised ring 28 of the bottom plate 10. The bottom plate 10 has a depressed ring 40 adjacent to the raised ring 38 and extending inward from the raised ring 38. A locking ring 26, from which the catches 20 may extend, is provided between the outermost edge 12 and the center 14. Specifically, the locking ring 26 is adjacent to the depressed ring 40. The locking ring 26 is raised relative to the depressed ring 40 and extends inward from the depressed ring 40.

The relative positioning of the raised ring 38, depressed ring 40, locking ring 26, and depressed center area 32, and whether all or some of them are present, may vary. For example, the raised ring 38 and the locking ring 26 may be at the same relative height. Similarly, the depressed ring 40 and the depressed center area 32 may be at the same relative height. Alternately, the raised ring 38 may be higher than the locking ring 26, or the locking ring 26 may be higher than the raised ring 38. Likewise, the depressed ring 40 may be higher than the depressed center area 32, or the depressed center area 32 may be higher than the depressed ring 40. In some arrangements, the best relative positioning is determined by the configuration of the adaptor 42, the filter cage 66, and/or the motor housing 62. The raised ring 38, depressed ring 40, and/or locking ring 26 may also have surfaces that are slanted or sloped relative to horizontal or to one another.

As shown in FIG. 2, an annular groove 88 may be provided in the raised ring 38 of the bottom plate 10. The annular groove 88 establishes different elevation levels for the filter media 22 to rest upon during manufacturing. This ensures that the filter media 22 has a sub-flush condition relative to at least some portions of the bottom plate 10. As also shown in FIG. 2, standoffs 90 may be provided in the raised ring 38 of the bottom plate 10. The standoffs 90 position the cylindrical support cage 108 (shown in FIG. 5), which may be formed from metal or another rigid material, at an elevation deliberately sub-flush relative to at least some portions of the bottom plate 10. The sub-flush condition avoids undesirable handling issues for the user and assures that the bottom plate 10 has optimum sealing potential.

Referring now to the exemplary arrangement of an adaptor 42 shown in FIGS. 9-15C, the adaptor 42 has an annular surface 44 having an outer circumference 46 and an inner circumference 48. Snaps 50 are distributed around the outer circumference 46 of the annular surface 44. A radial retention ring 52 extends from the inner circumference 48 of the annular surface 44. The adaptor 42 may be formed from rubber, hard plastic, metal, or another suitable material. The radial retention ring 52 should be formed from a material having the ability to flex while still retaining its shape. In some arrangements, the radial retention ring 52 may be formed from a material that differs from that used for the rest of the adaptor 42. In other arrangements, the same material may be used for both the radial retention ring 52 and the rest of the adaptor 42.

Figure 15A:
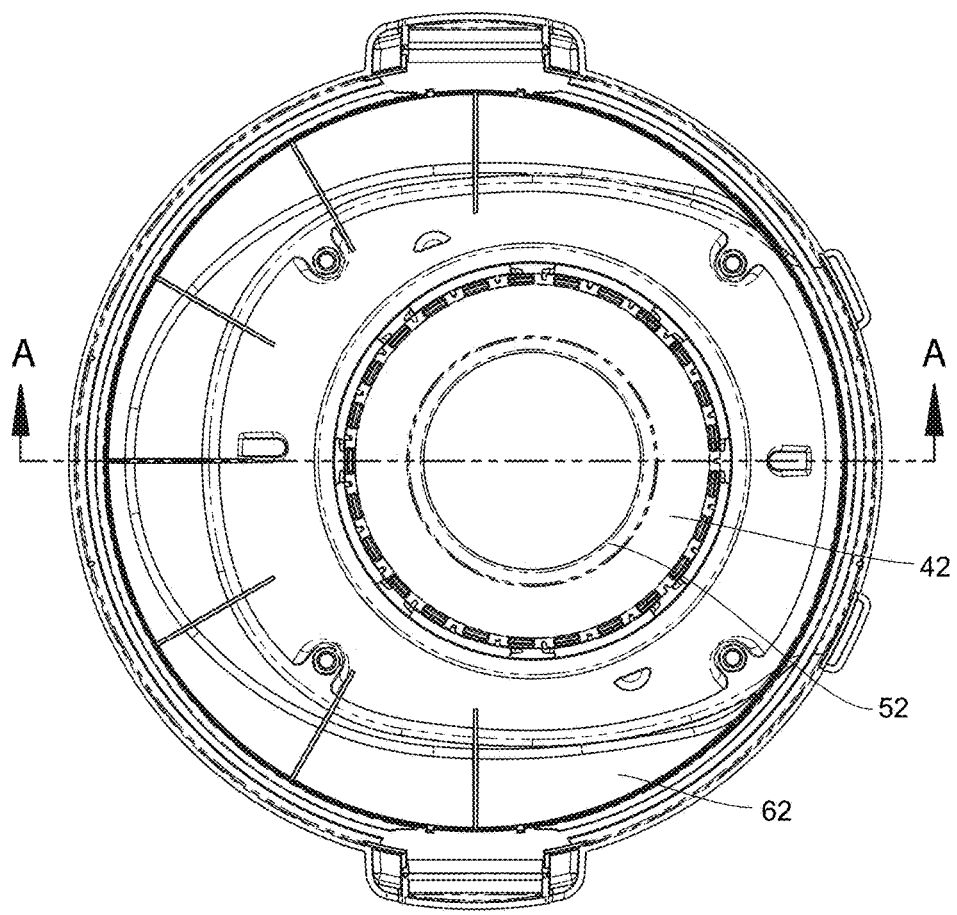
FIG. 15A is a bottom view of the lid depicted in FIG. 14 with the adaptor secured to the end of the filter cage.
Figure 15B:
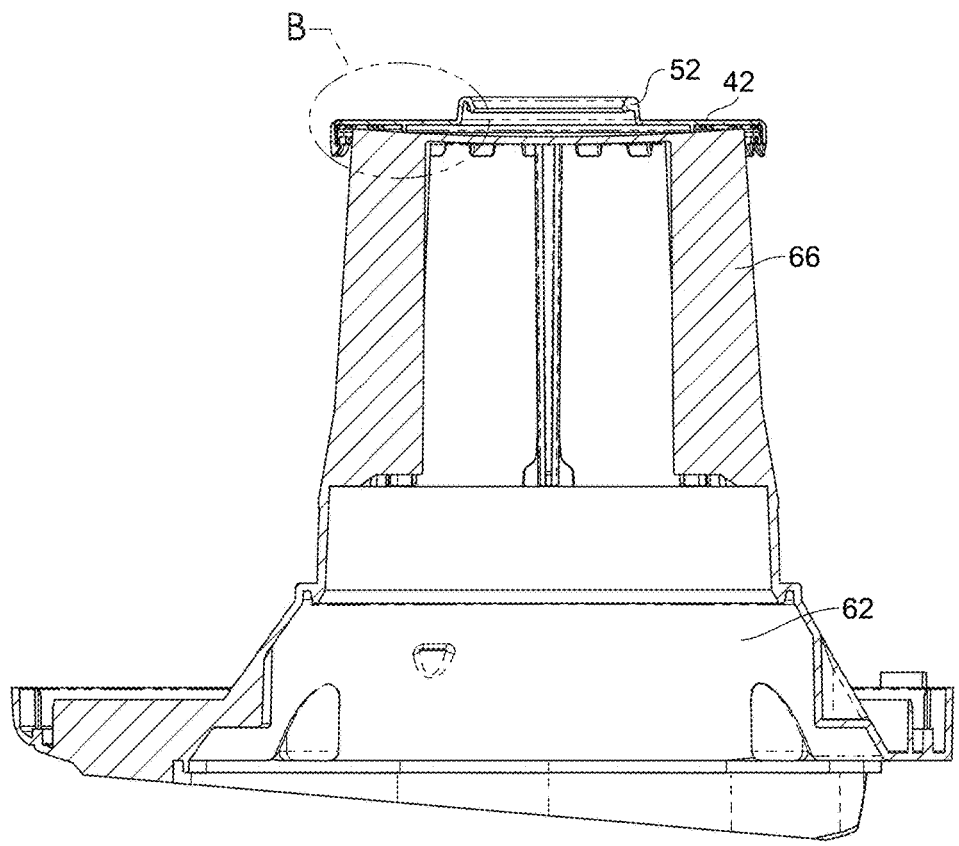
FIG. 15B is a cross-sectional view of the filter cage and adaptor depicted in FIG. 15A along the line A-A.
Figure 15C:
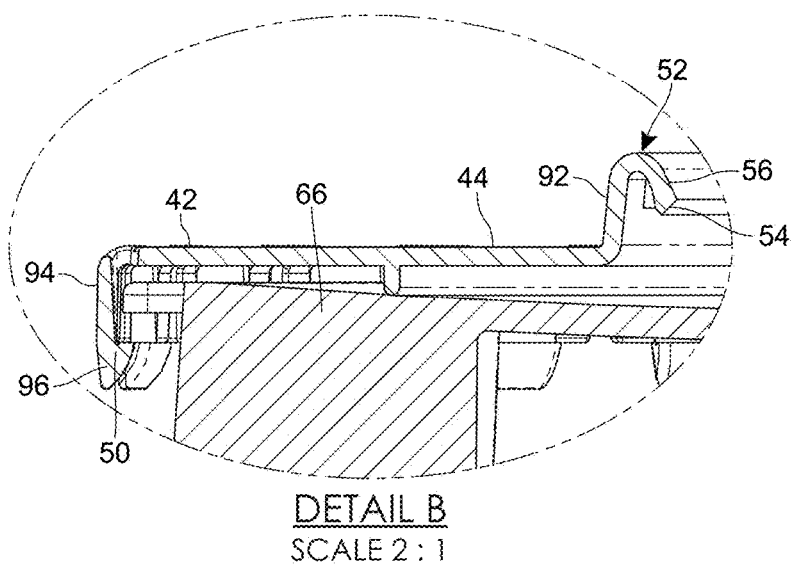
FIG. 15C is an enlarged view of the filter cage and adaptor depicted in FIG. 15B showing the snaps and radial retention ring of the adaptor.

As shown best in FIG. 15 C, the snaps 50 secure the adaptor 42 onto a filter cage 66 of a vacuum cleaner 2. Each snap 50 has a vertical extension 94 that allows the snap to hang downward over the edge of a filter cage 66. Each snap 50 further includes a clip 96. The clip 96 engages the filter cage 66. The clip 96 may include a cut-out section, such as the 90° cut-out section shown as part of the clip 96 in FIG. 15C. Alternately, the clip may have a hook-like curvature or another suitable shape that allows engagement with the filter cage 66. The number of snaps 50 distributed around the outer circumference 46 of the annular surface 44 may vary. In the arrangement shown in FIGS. 9-15C, twenty-five snaps 50 are equally distributed around the outer circumference 46. However, in other arrangements not herein depicted, the number of snaps 50 may be much lower, such as five or ten, or much higher, such as 50 or 100. In part, the number of snaps 50 may depend on the radial distance that each snap 50 covers of the outer circumference 46. Additionally, the number of snaps 50 may depend on the radial distance between each snap 50. The snaps 50 do not have to be equally distributed around the outer circumference 46. In some arrangements, two or more snaps 50 may be clustered together and spaced radially from another cluster of two or more snaps 50.

In other arrangements not herein depicted, the adaptor 42 may be connected to the filter cage 66 by means other than or in addition to the snaps 50. For example, the annular surface 44 of the adaptor 42 may be provided with an adhesive that can permanently or temporarily secure the adaptor to the filter cage 66. The adhesive might be provided on the annular surface 44 at the point of sale, and a user may simply remove an adhesive covering prior to securing the annular surface 44 to the filter cage 66. Alternately, the adhesive might be provided in a separate bottle or jar and then spread onto the annular surface 44, prior to securing the annular surface 44 to the filter cage 66. Optionally, adhesive may be provided even with an adaptor 42 that includes snaps 50.

Figure 16:
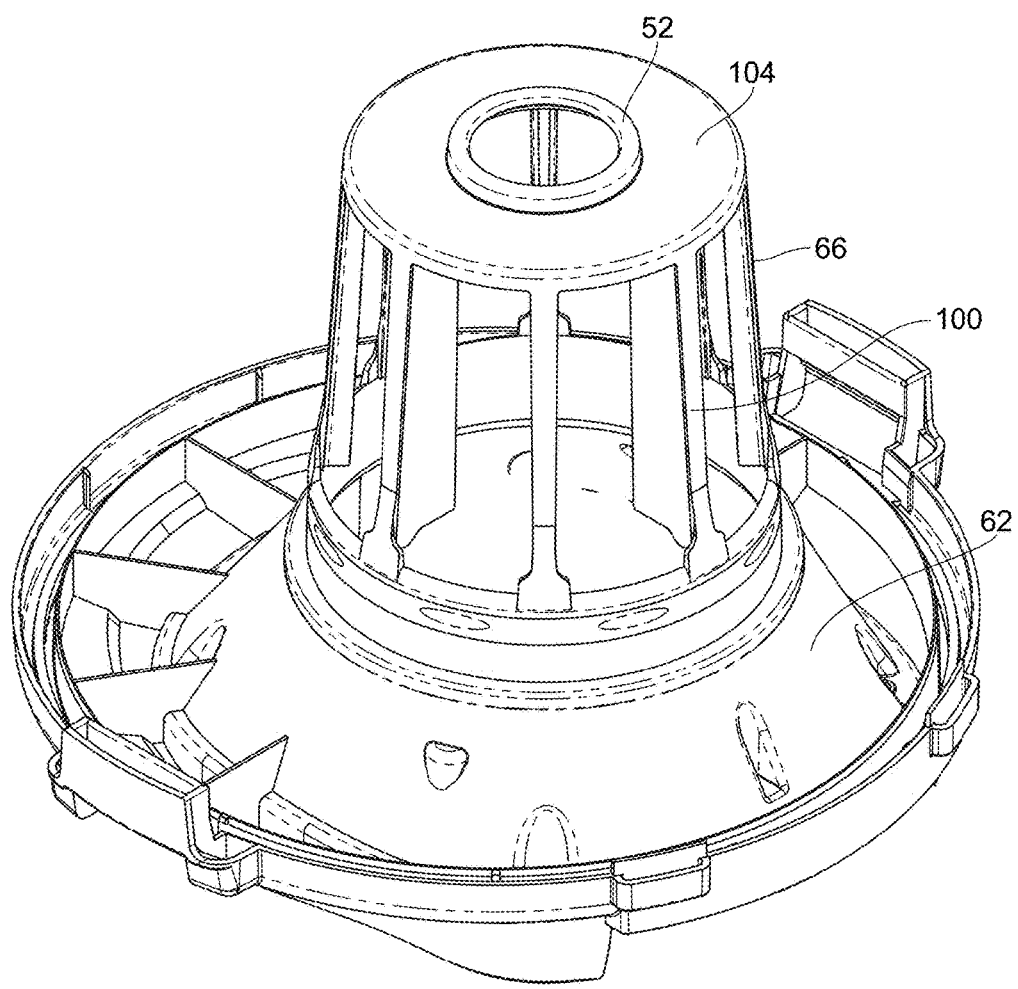
FIG. 16 is a bottom isometric view of a motor housing and filter cage of the present disclosure with a radial retention ring integrally formed with the filter cage.
Figure 17A:
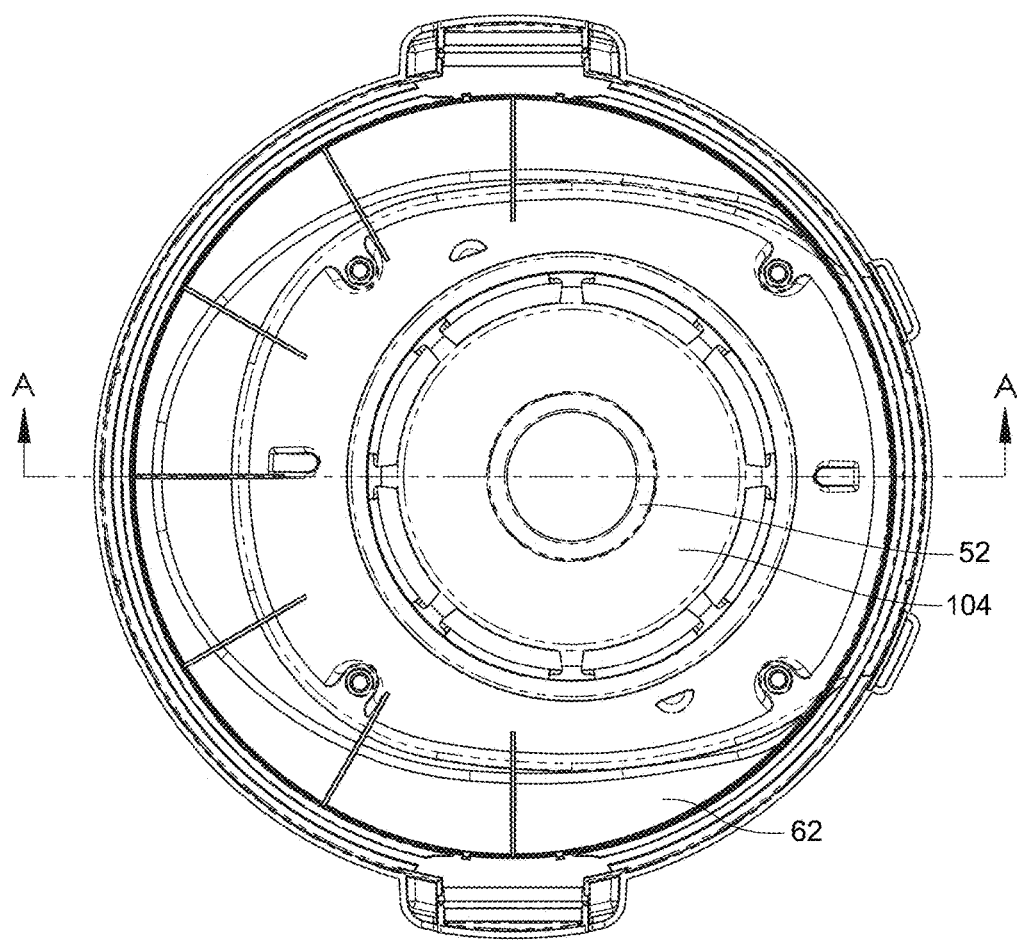
FIG. 17A is a bottom view of the lid depicted in FIG. 16 with the radial retention ring integrally formed with the filter cage.
Figure 17B:
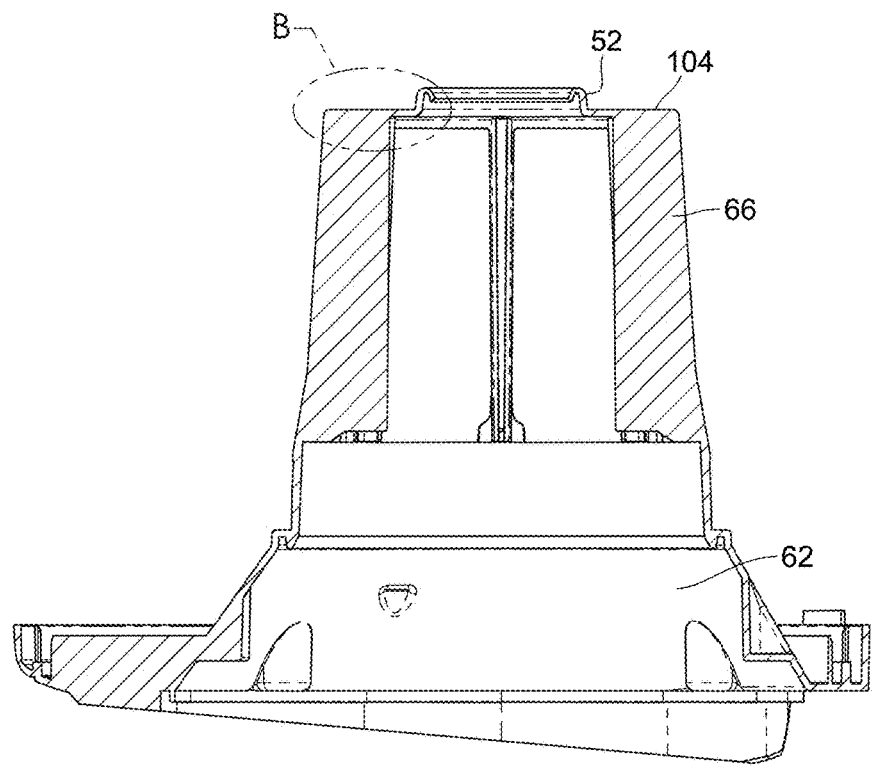
FIG. 17B is a cross-sectional view of the filter cage having an integrally formed radial retention ring depicted in FIG. 17A along the line A-A.
Figure 17C:
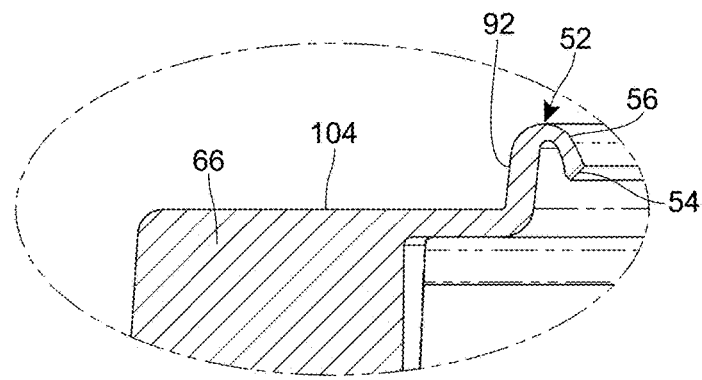
FIG. 17C is an enlarged view of the filter cage and integrally formed radial retention ring depicted in FIG. 17B.

As depicted in FIGS. 16-17C, the radial retention ring 52 may be integrally formed with the filter cage 66. In such arrangements, the radial retention ring 52 extends from the round surface 104 of the filter cage 66. Such a design is beneficial in that one fewer part is needed, i.e., an adaptor 42 does not have to be connected to a filter cage 66 by snaps 50 or by any other means. The radial retention ring 52 may be formed from the same material or a different material than is used to form the round surface 104 of the filter cage 66.

Regardless of whether the radial retention ring 52 is provided on an adaptor 42 or is integrally formed with the filter cage 66, the radial retention ring 52 has a mating end 54 inclined in a first direction relative to the annular surface 44 and an sliding surface 56 that meets the mating end 54 at an angle. The radial retention ring 52 further includes a vertical surface 92 that raises the sliding surface 56 and the mating end 54 above the annular surface 44. The mating end 54 is depicted in FIG. 15C as being at an angle of 45° relative to the annular surface 44. In other arrangements, the mating end 54 may be at an angle greater than 45° relative to the annular surface 44 or less than 45° relative to the annular surface 44. Instead of being at an angle, the mating end 54 may have a curvature, hook, snap, aperture, or other means of being secured in place.

Figure 9:
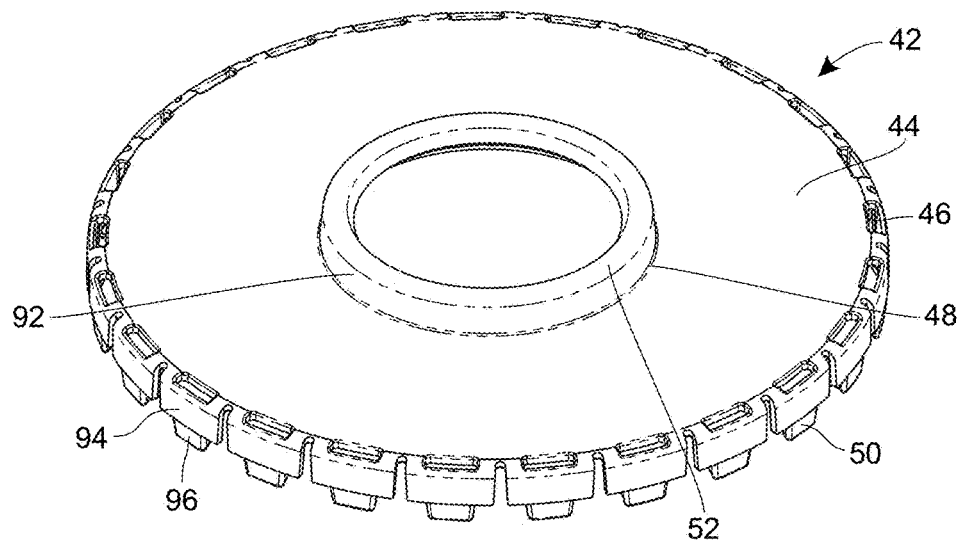
FIG. 9 is a top isometric view of an adaptor of the present disclosure.
Figure 10:
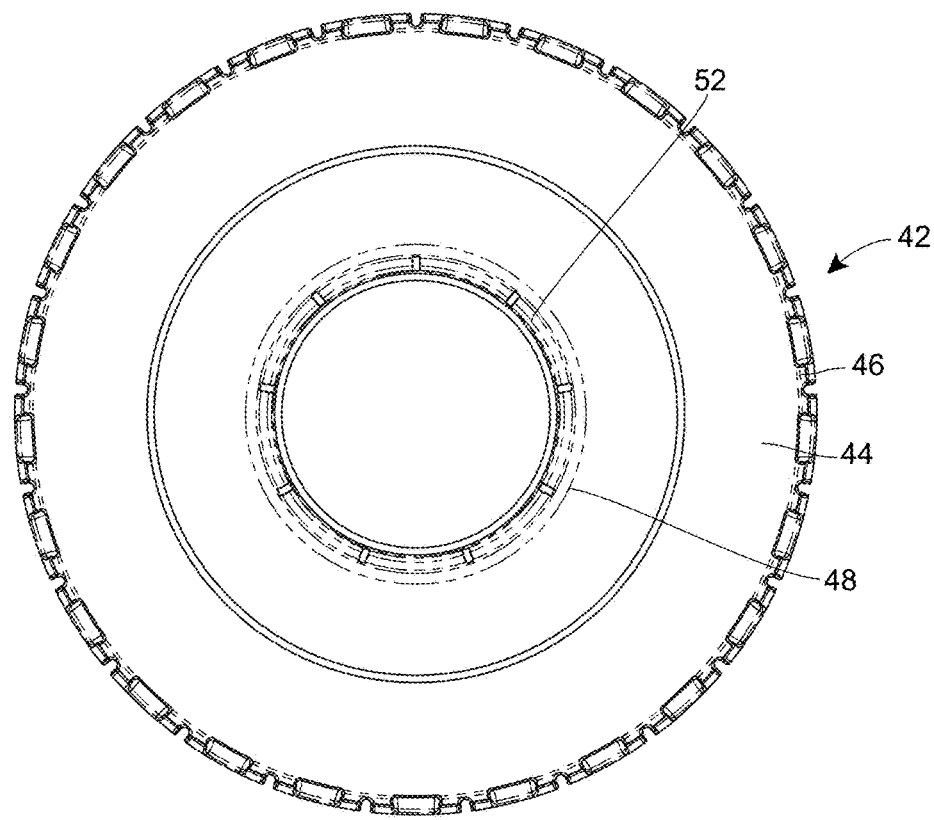
FIG. 10 is a top view of the adaptor depicted in FIG. 9.
Figure 11:
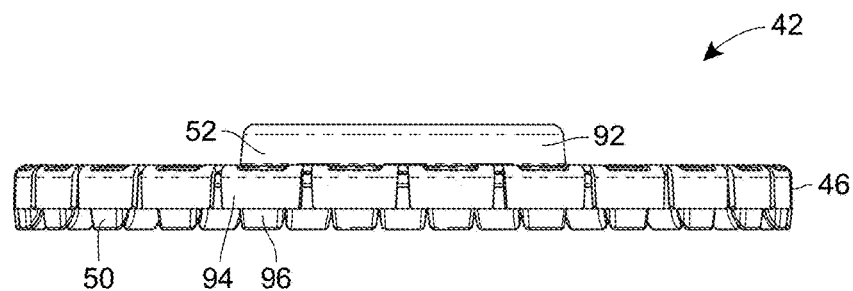
FIG. 11 is a side view of the adaptor depicted in FIGS. 9-10.
Figure 12:
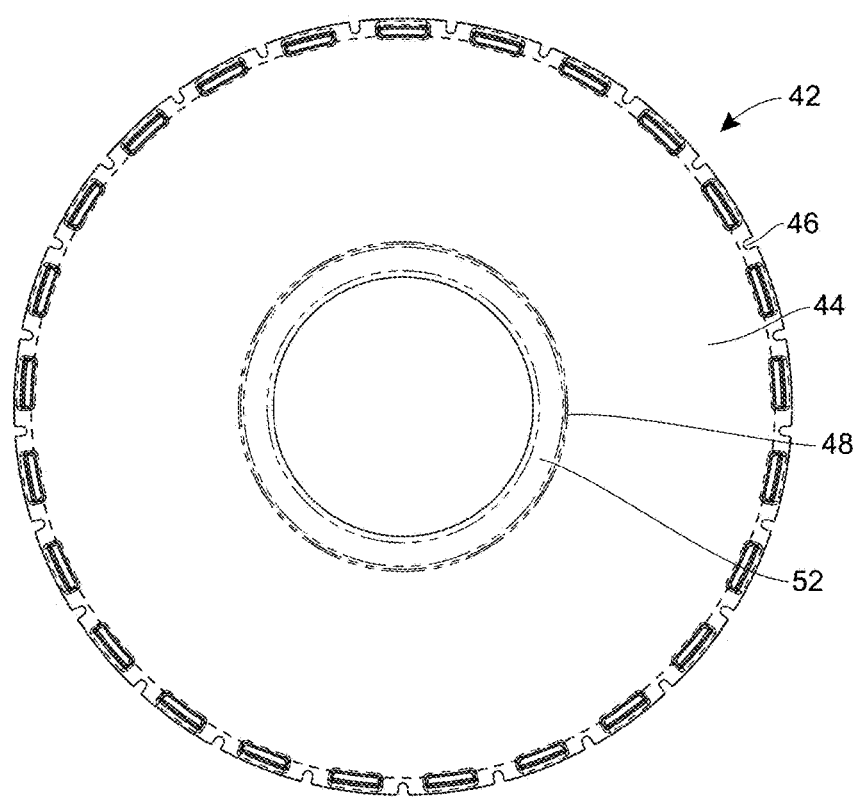
FIG. 12 is a bottom view of the adaptor depicted in FIGS. 9-11.

The radial retention ring 52 extends continuously around the entire inner circumference 48 of the annular surface 44 as best shown in FIGS. 9 and 16. In other arrangements not herein depicted, the radial retention ring 52 may extend discontinuously around the inner circumference 48 of the annular surface 44. In such arrangements, the radial retention ring 52 may have the discontinuous parts distributed uniformly or non-uniformly around the inner circumference 48.

Figure 22:
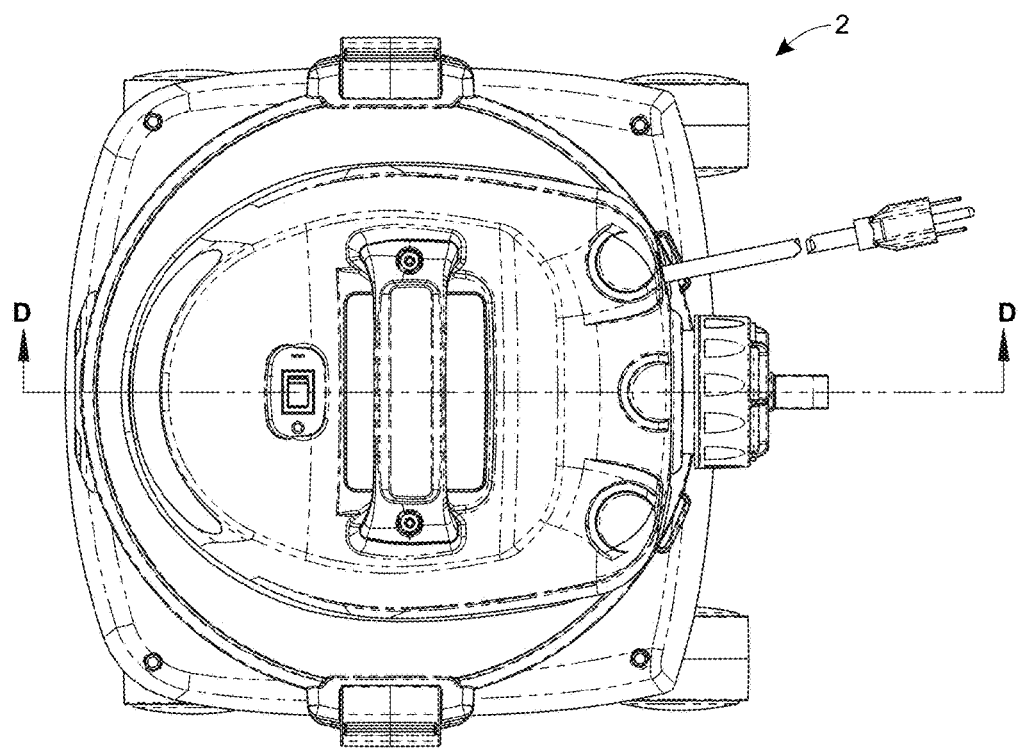
FIG. 22 is a top view of a vacuum cleaner incorporating the filter and adaptor of the present disclosure.
Figure 23:
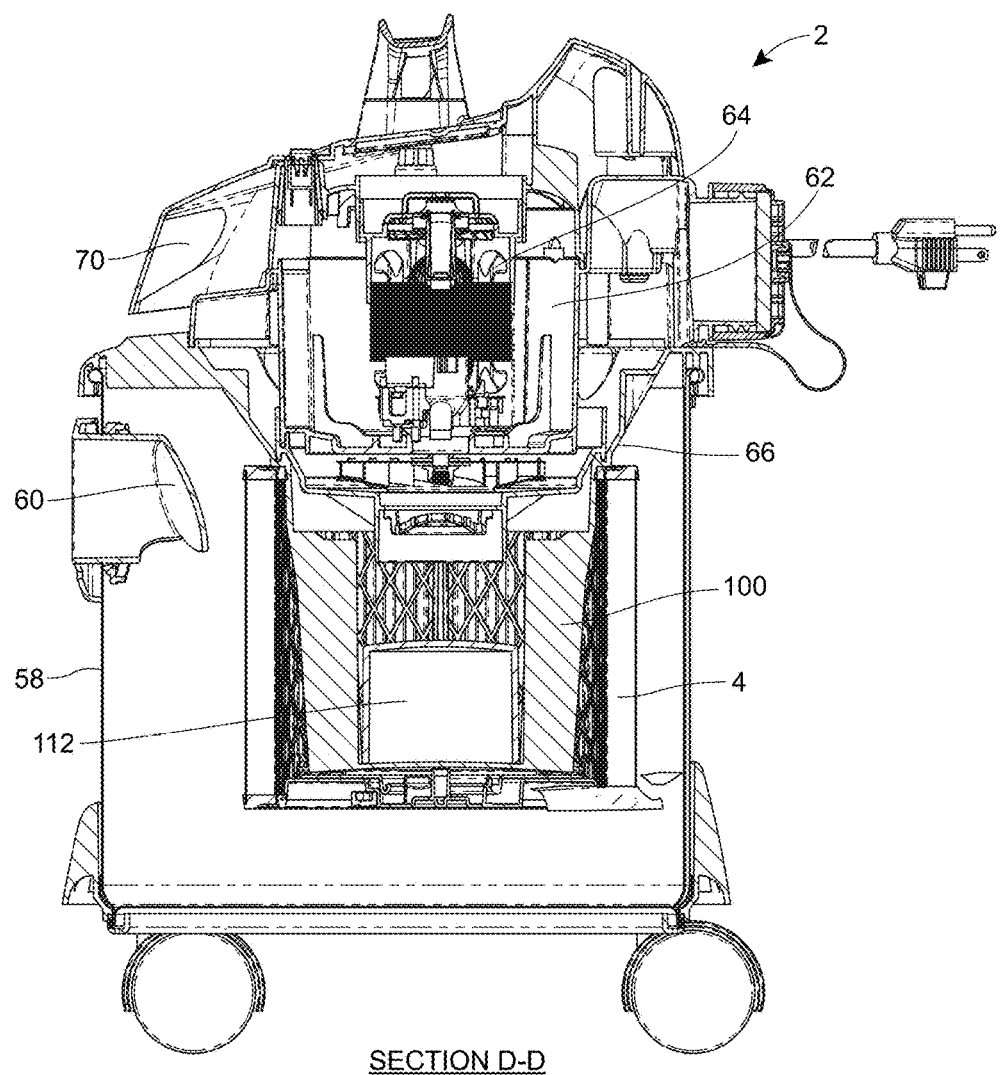
FIG. 23 is a cross-sectional view of the vacuum cleaner of FIG. 22 along line D-D.

FIGS. 22-23 show the filter 4 and adaptor 42 in use on a vacuum cleaner 2. As shown in FIG. 23, the vacuum cleaner 2 includes a tank 58 having a dirty air inlet 60, a motor housing 62, a motor 64, a filter cage 66 having an end 68, and a clean air outlet 70. A radial retention ring 52 is connected to the end 68 of the filter cage 66. A cup float 112 is provided within the filter cage 66. The cup float 112 moves upward within the filter cage 66 when water sucked into the vacuum 2 rises to a high enough level within the vacuum 2 to move the cup float 112. If enough water accumulates within the vacuum 2, the cup float 112 seals the vacuum 2 such that air can no longer flow through the vacuum 2. This is a safety feature that prevents water from being sucked into the motor housing 52 and prevents normal operation of the vacuum 2.

The filter cage 66 has struts 100 that end at a round surface 104. The filter cage 66 could be formed of plastic, metal, or another suitable structural material. The number of struts 100 may vary. In some arrangements, the struts 100 may extend vertically between the motor housing 52 and the round surface 104. In other arrangements, the struts 100 may be arranged at an angle, may be perforated or patterned, or may have any other structural configuration suitable to keeping the round surface 104 spaced away from the motor housing 52. The struts 100 may or may not be uniformly distributed around the round surface 104.

Projections 98 extend from the round surface 104 of the filter cage 66. Gaps 102 are provided between projections 98. The projections 98 may be uniformly distributed around the round surface 104 of the filter cage 66. Alternately, the projections 98 may be clustered in groups or may be separated by gaps 102 of differing lengths. In some arrangements, the gaps 102 are provided directly above the struts 100.

Figure 13:
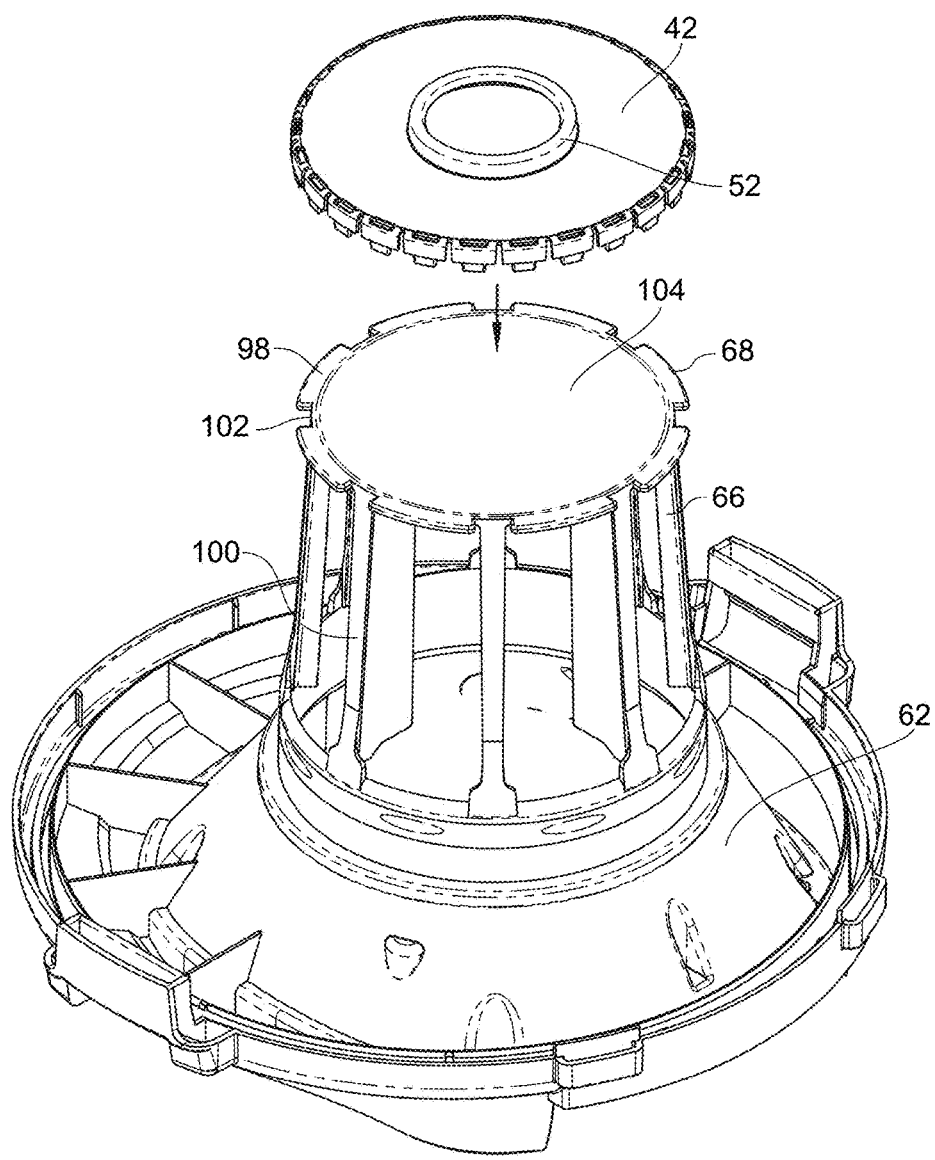
FIG. 13 is a bottom isometric view of a lid of a vacuum cleaner with an adaptor being installed on an end of a filter cage of the motor housing.
Figure 14:
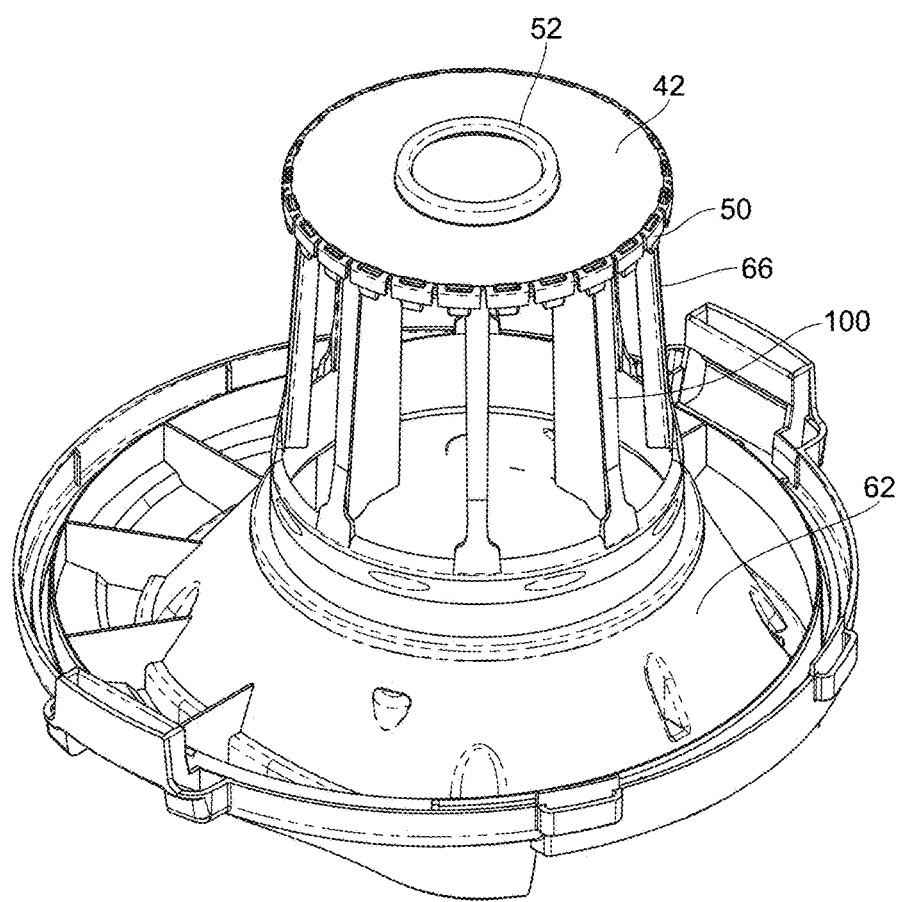
FIG. 14 is a bottom isometric view of the motor housing depicted in FIG. 10 with the adaptor secured to the end of the filter cage.

In the arrangement depicted in FIG. 13, the snaps 50 of the adaptor 42 are configured to engage the projections 98 of the filter cage 66. However, in other arrangements not herein depicted, the snaps 50 may be configured to engage the gaps 102 of the filter cage 66. In such an arrangement, the snaps 50 would be intentionally distributed on the adaptor 42 to align with the gaps 102 of the filter cage 66. The outer circumference 46 of the annular surface 44 of the adaptor 42 would be smaller than the round surface 104 of the filter cage 66.

Figure 18:
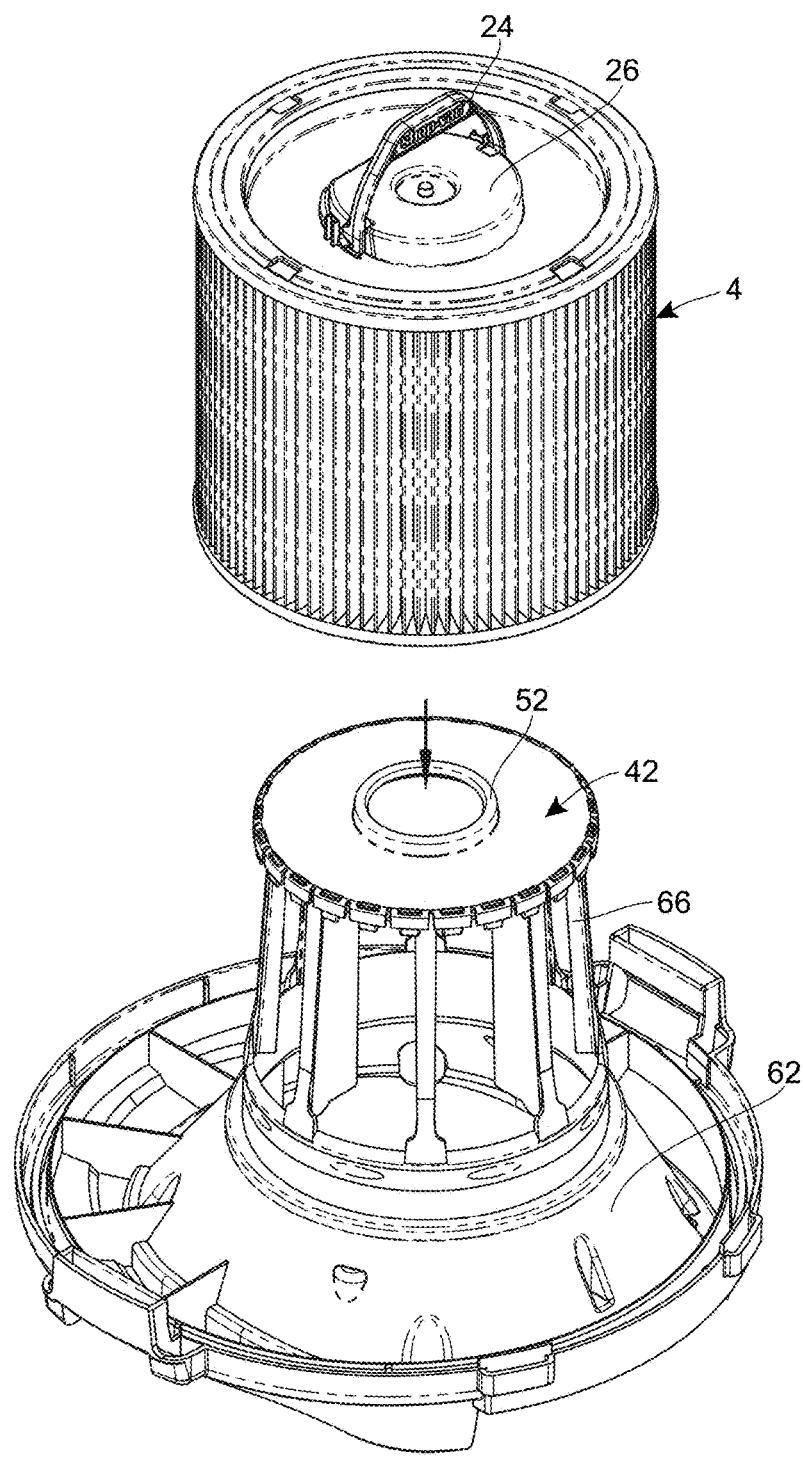
FIG. 18 is a bottom isometric view of a filter being installed on the filter cage and adaptor of FIGS. 14-15C.
Figure 19:
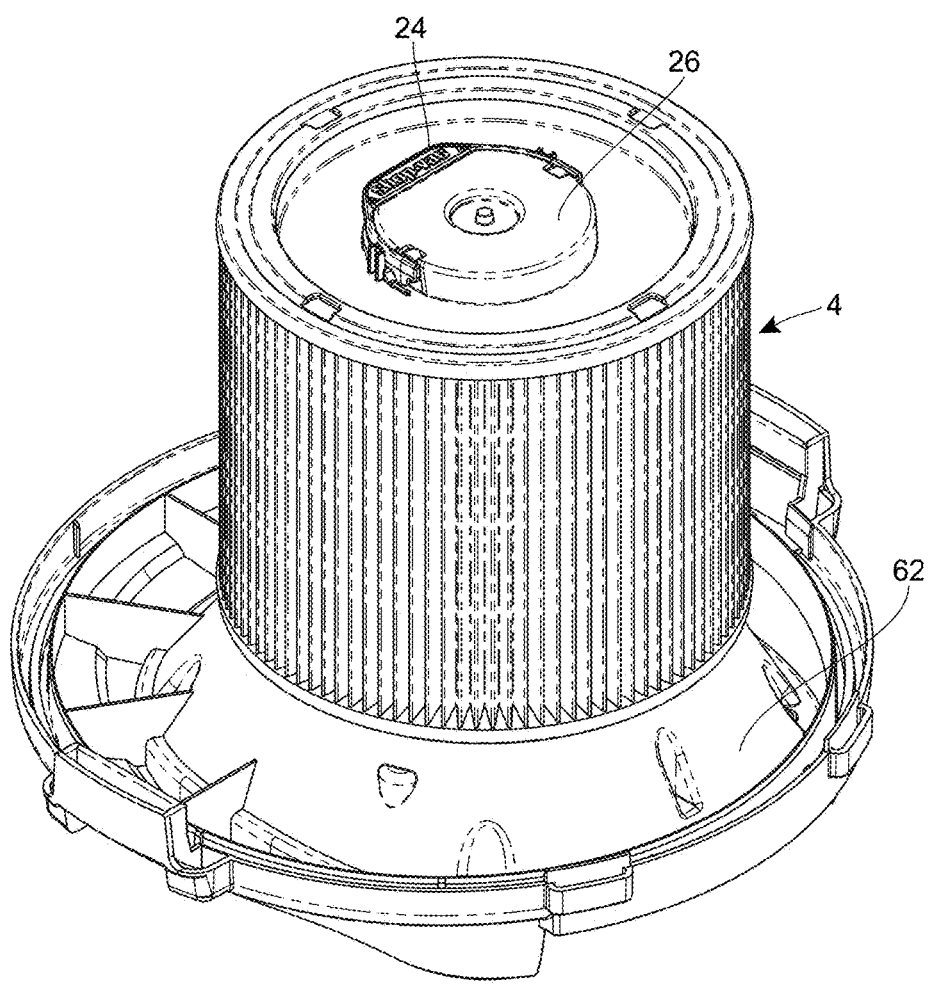
FIG. 19 is a bottom isometric view of the lid, adaptor, and filter of FIG. 18 with the filter secured to the adaptor.

As shown in FIG. 18, the filter cage 66 and, if present, adaptor 42, are inserted into the filter 4 so that the filter 4 surrounds the filter cage 66. As shown in FIG. 20C, prior to engagement of the catch 20 of the filter 4 with the radial retention ring 52 of the adaptor 42 or filter cage 66, the catch 20 flexes via contact between the inclined end 30 of the catch 20 and the sliding surface 56 of the radial retention ring 52. The flexing of the catch 20 allows the catch 20 to move past the radial retention ring 52 as the filter 4 is pressed onto the filter cage 66.

Once the catch 20 is past the radial retention ring 52, as shown in FIG. 21C, the catch 20 engages the radial retention ring 52. The mating face 28 of the catch 20 engages the mating end 54 of the radial retention ring 52. As shown here, the mating face 28 and the mating end 54 are complementary 45° angles. However, the mating face 28 and the mating end 54 may be connected via other complementary angles. Alternately, the mating face 28 and the mating end 54 may be connected via complementary curvatures, a hook and aperture, a snap, or another means. However, the mating face 28 and the mating end 54 should be optimally designed to be easily disconnected. The filter 4 may need to be removed and replaced. Therefore, the mating face 28 and the mating end 54 should allow reverse movement whereby the catch 20 is again flexed to allow the catch 20 to move past the radial retention ring 54 in the opposite direction.

One benefit of the annular design of the catch 20 and radial retention ring 52 is that the filter 4 can be pressed on to the filter cage 66 and/or adaptor 42 in any radial position without requiring certain elements to be carefully aligned. Another benefit is that the filter 4 is fully sealed once placed upon the filter cage. That is, there are no holes in the bottom plate 10 that dust or debris might enter. Yet another benefit is that the filter can be placed and removed merely by pushing and pulling, during which the user may hold the handle 24. The user therefore does not have to adjust any connection mechanisms or risk getting dirt or debris on his or her hands while removing a dirty filter.

What is claimed is:

1. A filter for a vacuum cleaner comprising:
   a top having an open center;
   a bottom plate having an outermost edge, a center, an inside surface facing towards the top and an outside surface facing away from the top, and a catch extending from the inside surface annularly around the center;
   filter material secured between the top and the bottom plate.

2. The filter of claim 1, wherein the catch extends from the inside surface around the center continuously.

3. The filter of claim 1, wherein the catch extends from the inside surface around the center discontinuously.

4. The filter of claim 1, further comprising a handle hinged to the outside surface of the bottom plate.

5. The filter of claim 4 wherein the handle is located adjacent to the center of the bottom plate.

6. The filter of claim 1, wherein the bottom plate further comprises a locking ring between the outermost edge and the center, and wherein the catch extends toward the top from the locking ring.

7. The filter of claim 1, wherein the catch has a mating face inclined in a first direction relative to the inside surface and an inclined end inclined in a second direction relative to the inside surface.

8. The filter of claim 7, wherein the mating face is at a 45° angle relative to the inside surface.

9. The filter of claim 1, wherein the bottom plate has a depressed center area at the center.

10. The filter of claim 9, wherein a center orifice is provided in the depressed center area.

11. The filter of claim 6, wherein a handle is hinged to the locking ring.

12. The filter of claim 11, wherein the handle has a width less than or equal to an amount that the locking ring is raised from the adjacent outside surface of the bottom plate, and wherein the locking ring has an outer perimeter complementary to the shape of the handle.

13. The filter of claim 1,
    wherein the top has an outer edge and a width between the outer edge and the open center;
    wherein the bottom plate has a raised ring extending inward from the outermost edge a distance equal to the width of the top; and
    wherein the filter material is secured between the top and the raised ring of the bottom plate.

14. The filter of claim 13,
    wherein the bottom plate further comprises a depressed ring adjacent to the raised ring and extending inward from the raised ring;
    wherein a locking ring is adjacent to the depressed ring, is raised relative to the depressed ring, and extends inward from the depressed ring; and
    wherein the catch extends toward the top from the locking ring.

15. An adaptor for a filter cage comprising:
    an annular surface having an outer circumference and an inner circumference;
    snaps distributed around the outer circumference of the annular surface; and
    a radial retention ring extending from the inner circumference of the annular surface.

16. The adaptor of claim 15, wherein the radial retention ring has a mating end inclined in a first direction relative to the annular surface.

17. The adaptor of claim 16, wherein the radial retention ring has a sliding surface the meets the mating end at an angle.

18. The adaptor of claim 15, wherein the radial retention ring extends continuously around the entire inner circumference of the annular surface.

* * * * *

UNITED STATES PATENT AND TRADEMARK OFFICE
CERTIFICATE OF CORRECTION

PATENT NO. : 10,368,706 B1
APPLICATION NO. : 16/037853
DATED : August 6, 2019
INVENTOR(S) : Craig A. Seasholtz et al.

Page 1 of 1

It is certified that error appears in the above-identified patent and that said Letters Patent is hereby corrected as shown below:

In the Claims

At Column 10, Line 43, "the meets" should be -- that meets --.

Signed and Sealed this
Fifth Day of May, 2020

Andrei Iancu
*Director of the United States Patent and Trademark Office*